Nov. 8, 1966 C. S. WILCOX 3,284,627
VEHICLE CONTROL SYSTEM
Filed Sept. 5, 1962 11 Sheets-Sheet 3
FIG. IC.
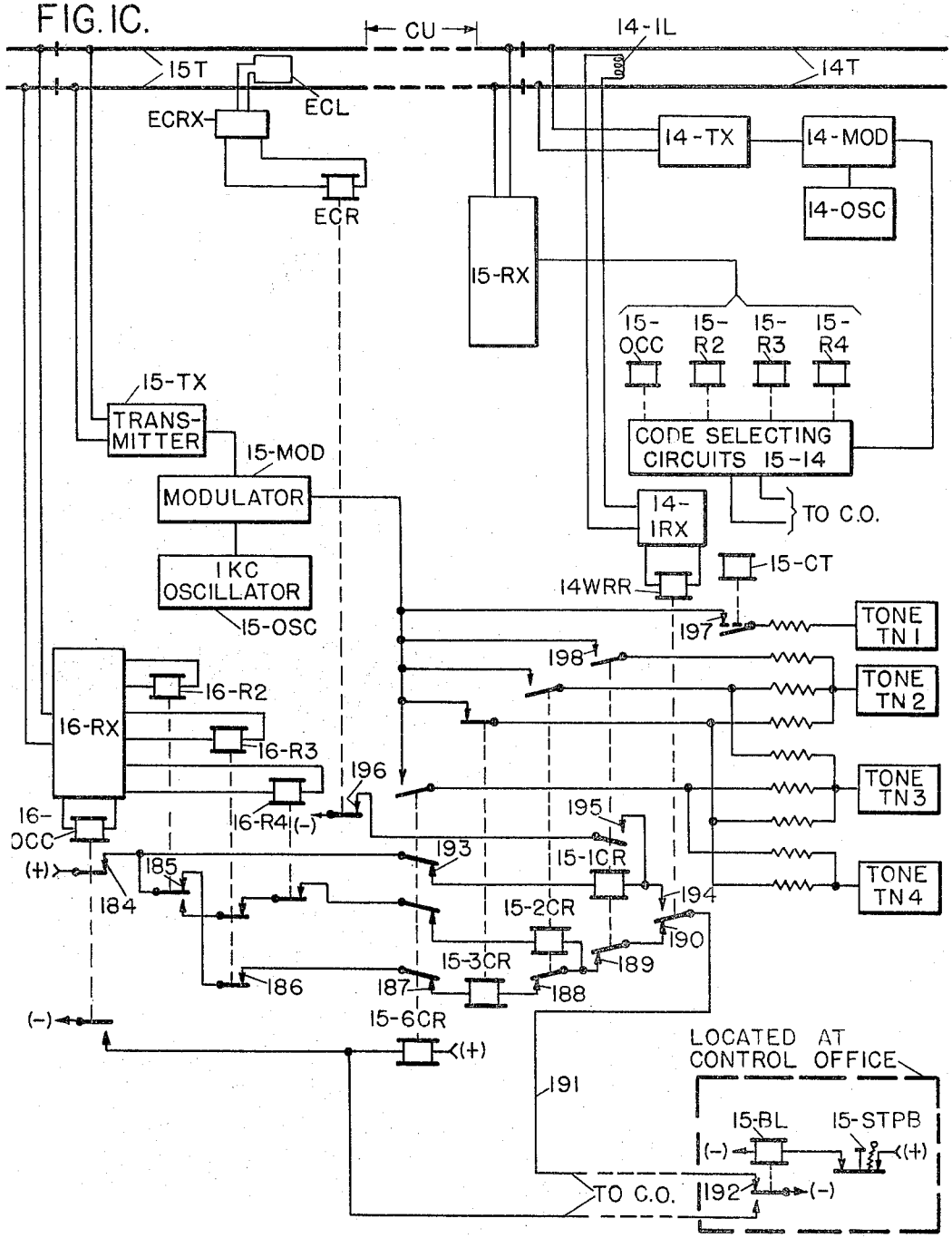
INVENTOR.
C.S. WILCOX
BY
Forest H. Hitchcock
HIS ATTORNEY

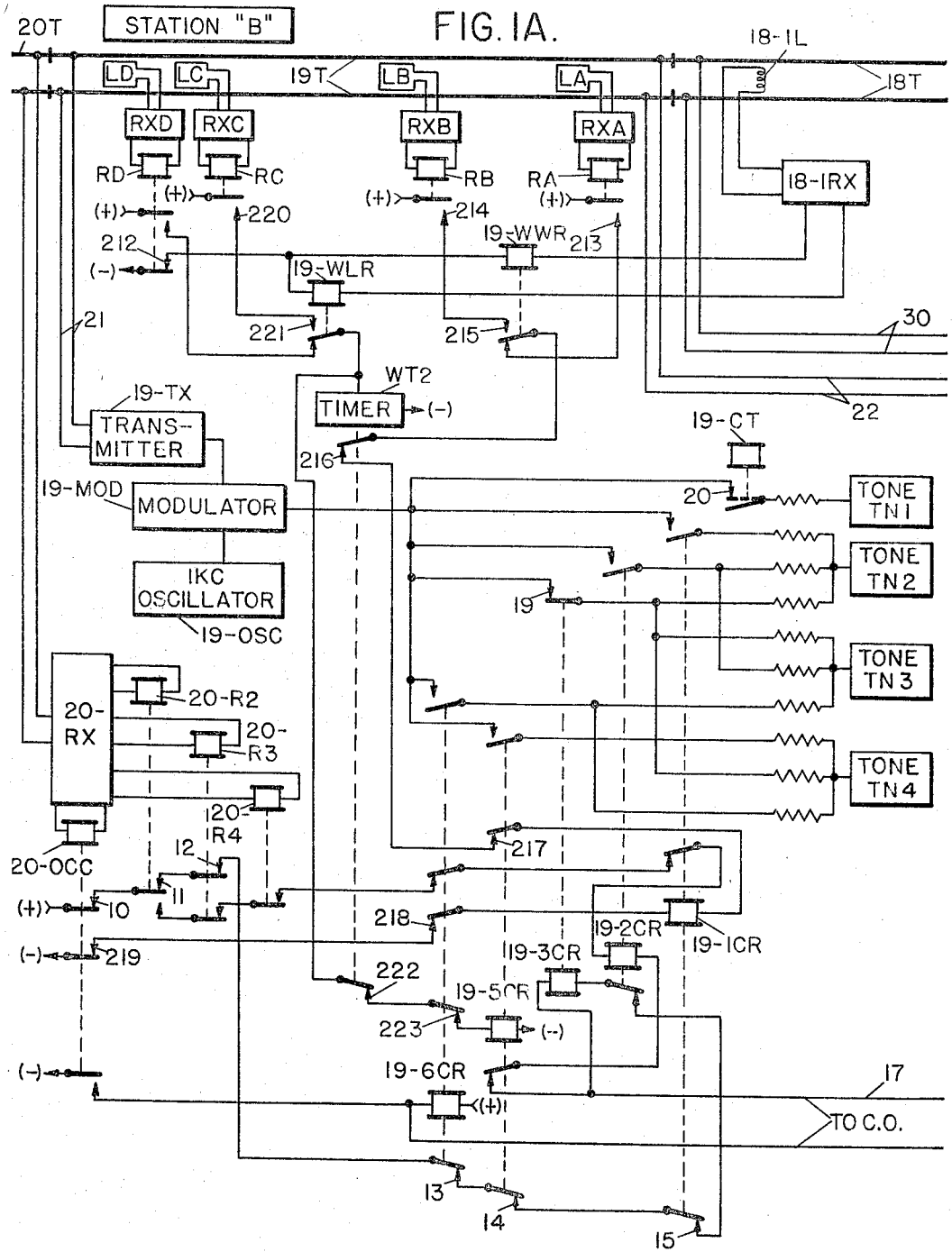

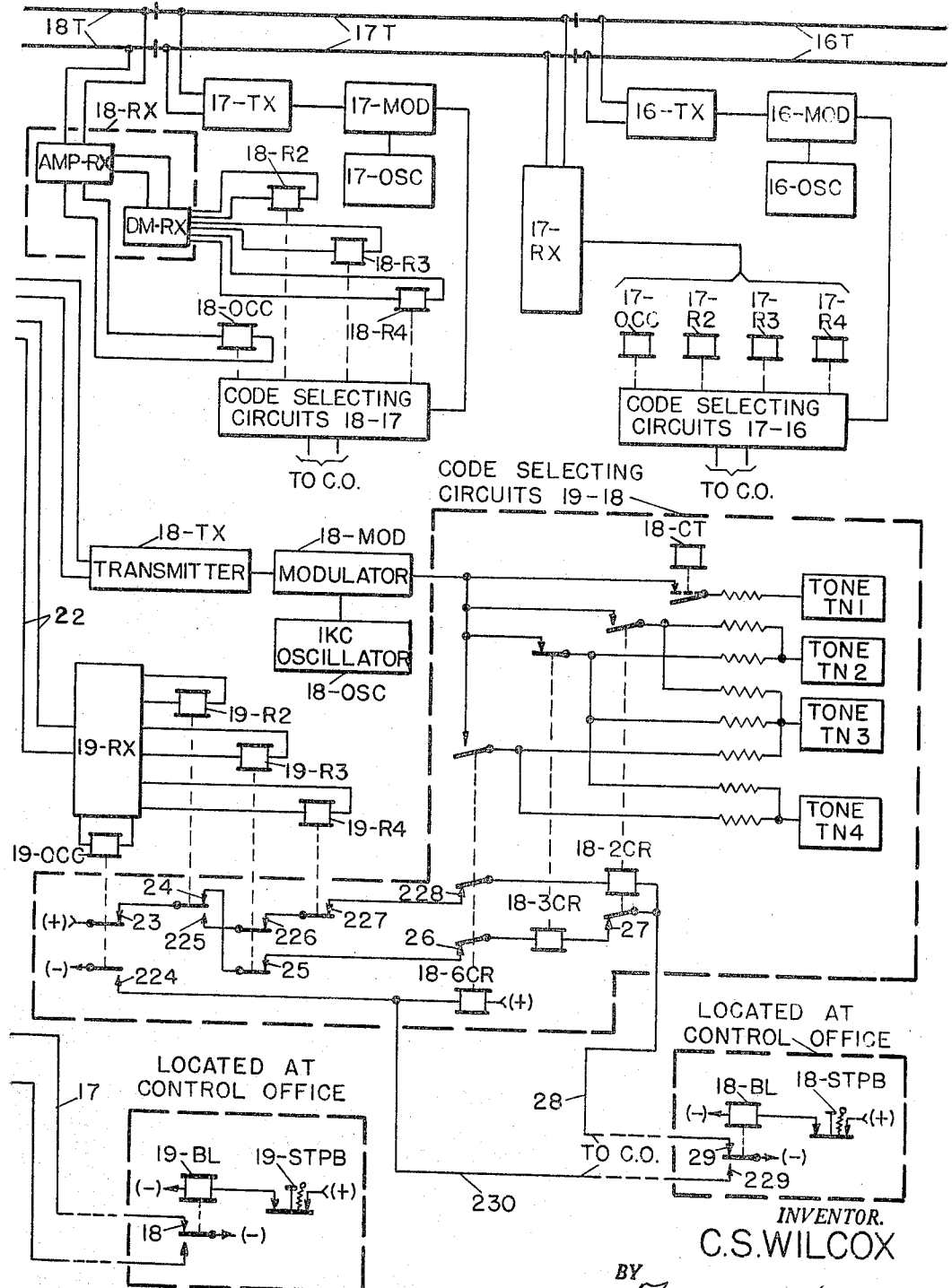

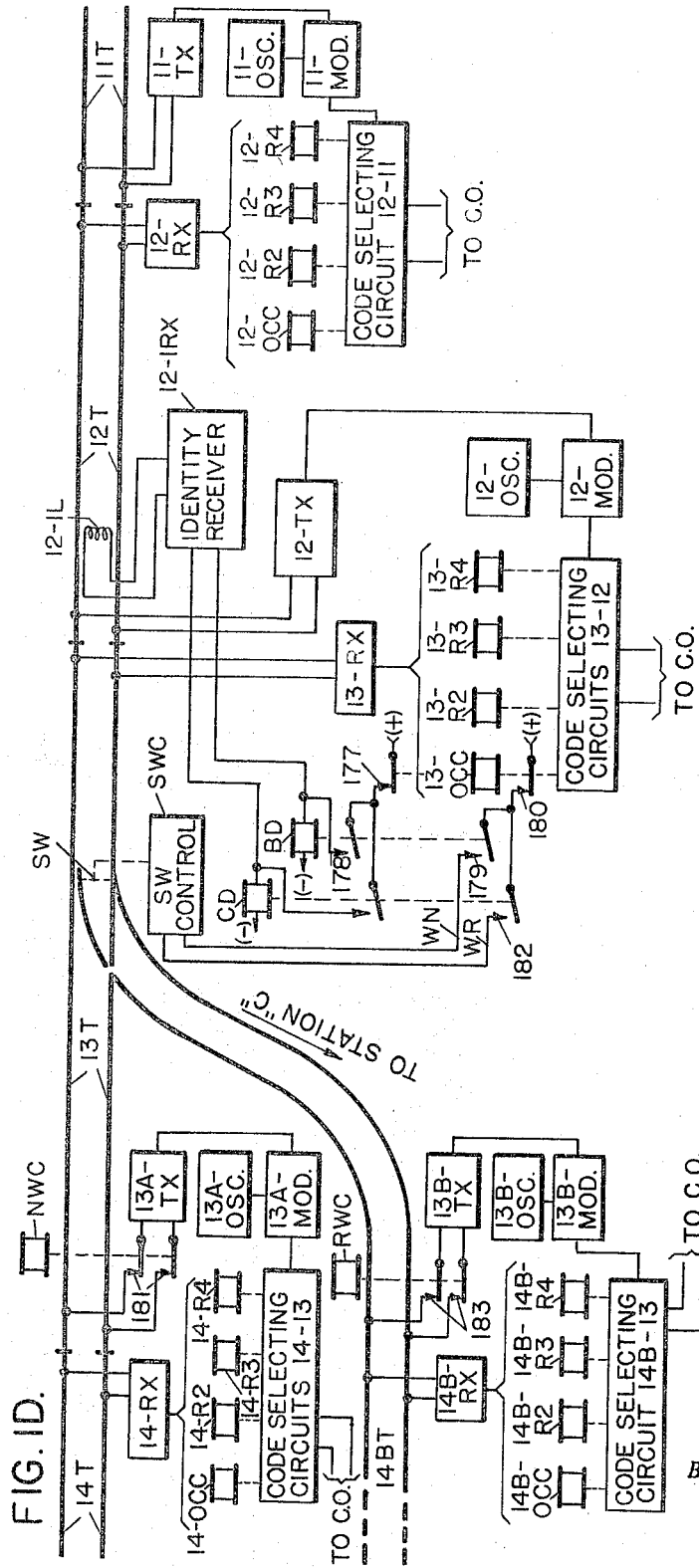

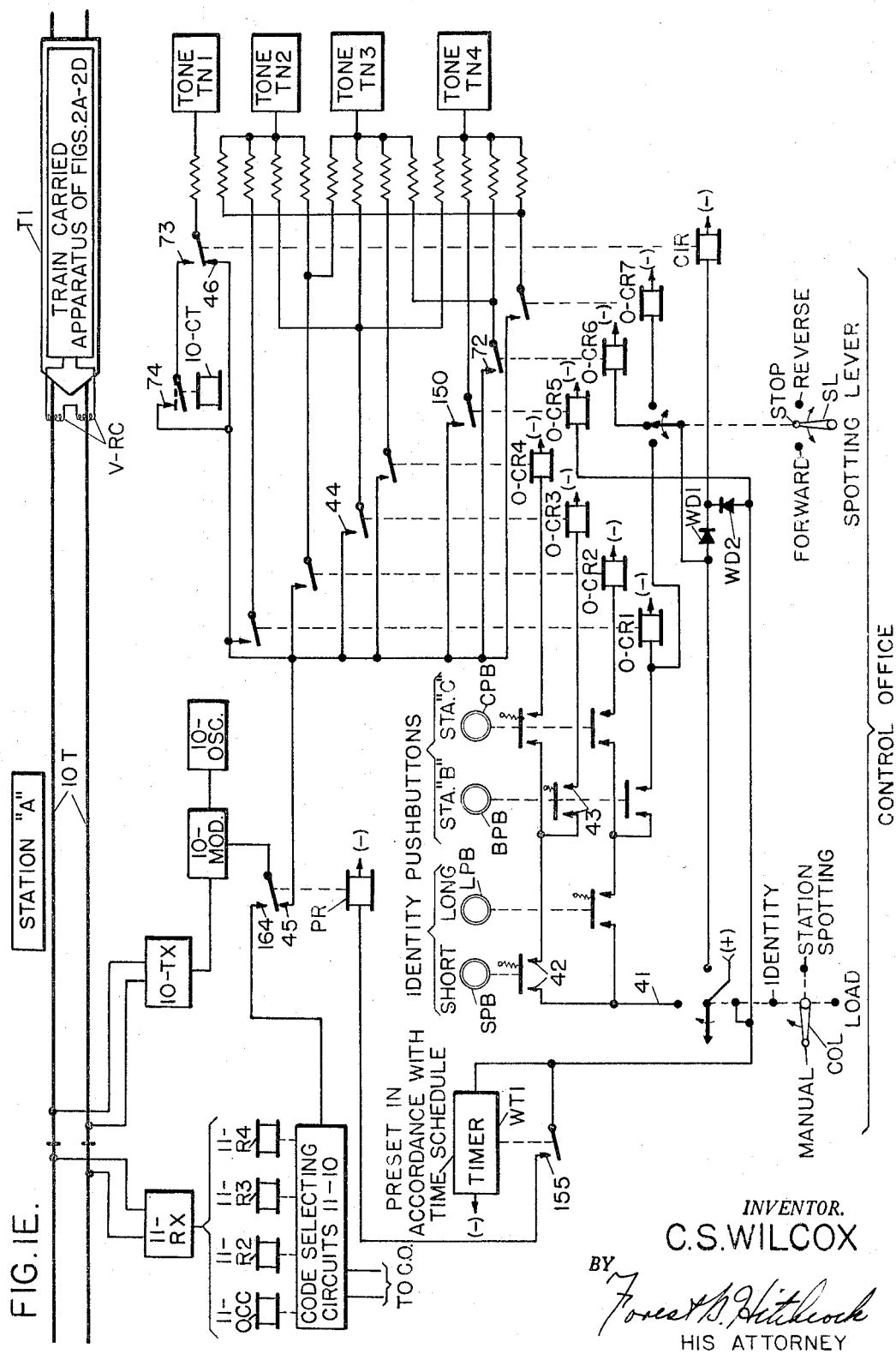

Nov. 8, 1966  C. S. WILCOX  3,284,627
VEHICLE CONTROL SYSTEM
Filed Sept. 5, 1962  11 Sheets-Sheet 6

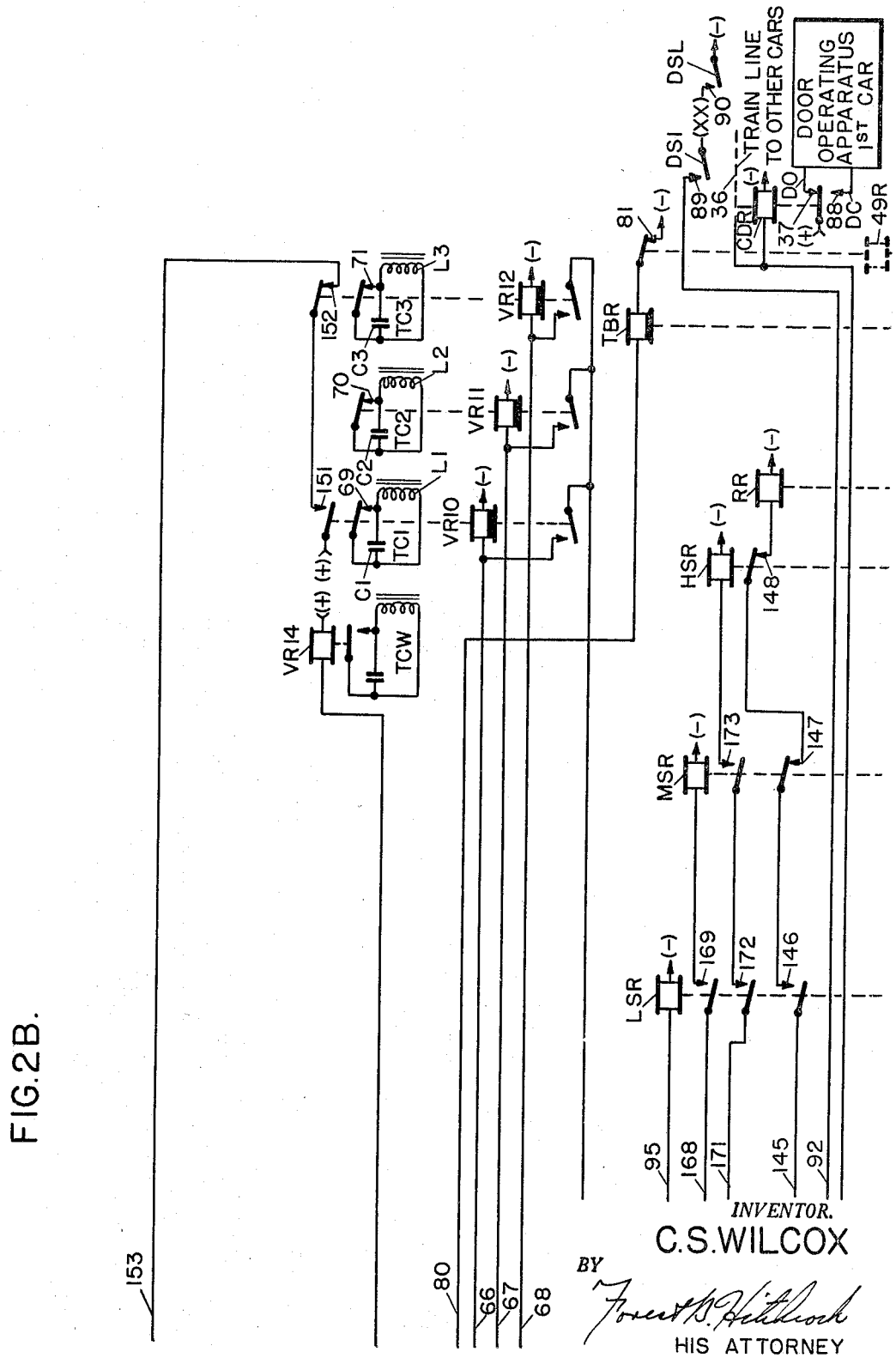

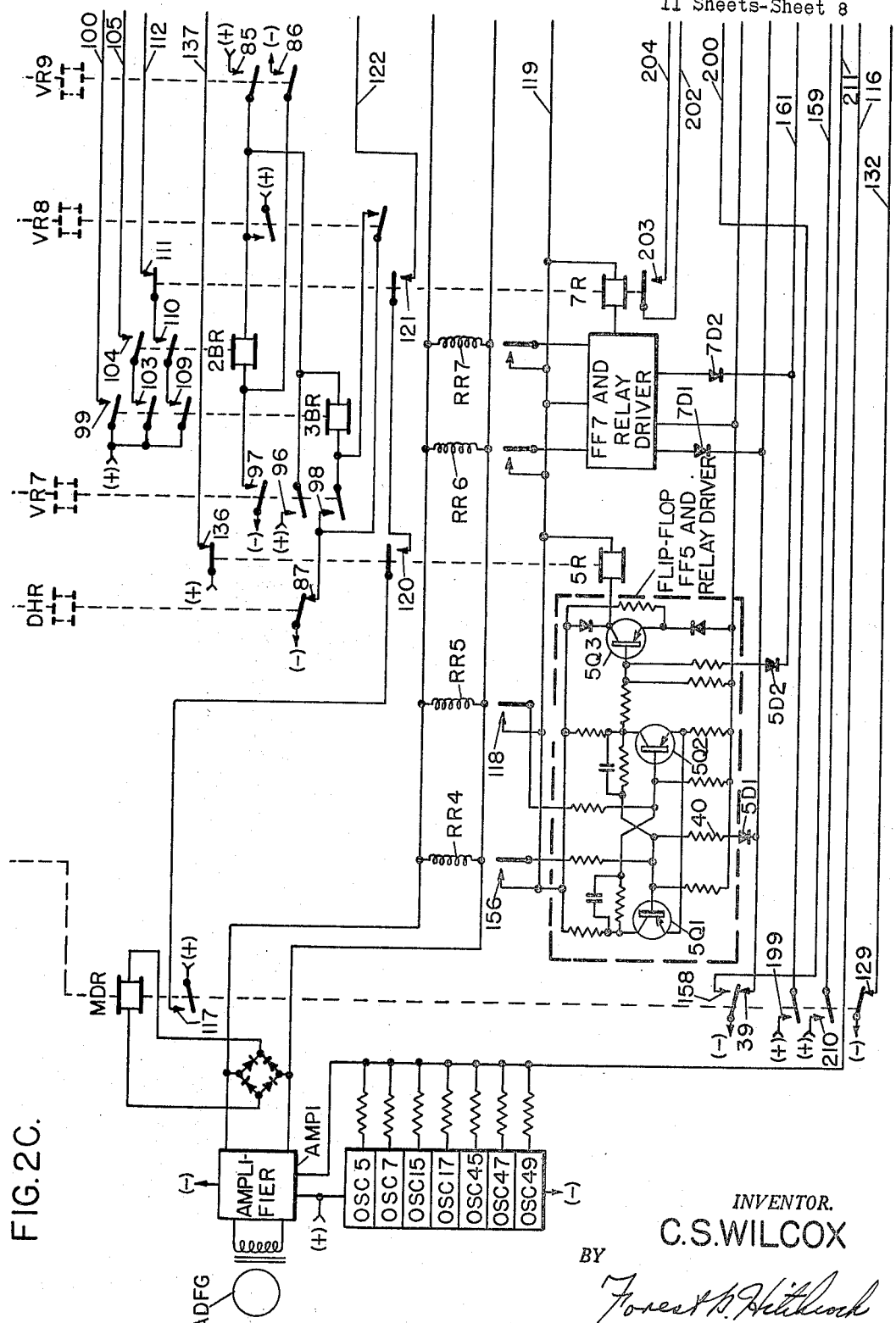

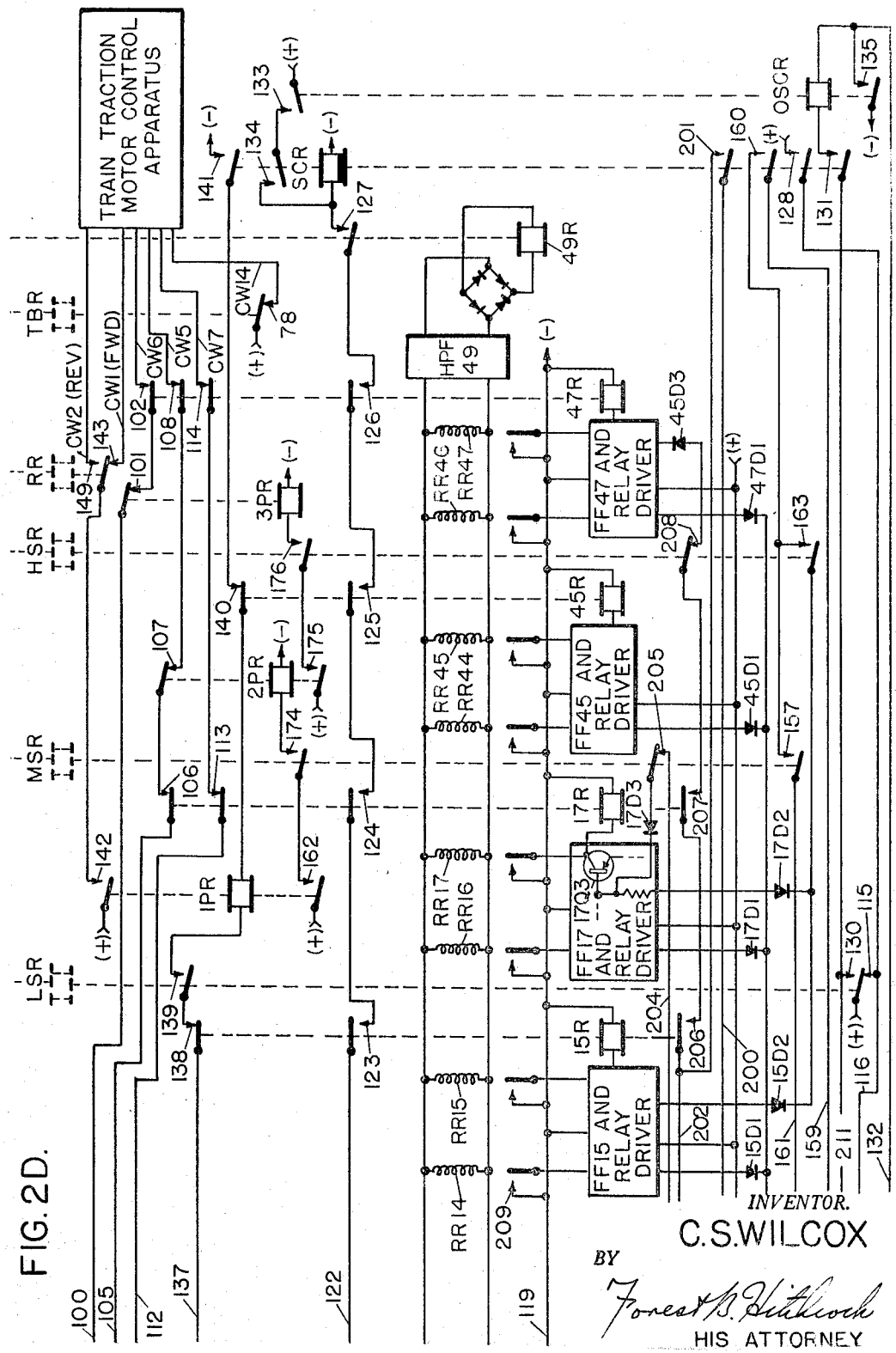

Nov. 8, 1966          C. S. WILCOX          3,284,627
VEHICLE CONTROL SYSTEM
Filed Sept. 5, 1962                              11 Sheets-Sheet 10

FIG. 3.

| TRAIN CONTROL | | | | |
|---|---|---|---|---|
| TRAIN OPERATION | TONES | | | |
| | TN1 | TN2 | TN3 | TN4 |
| LOW SPEED | ON CODED | ON | OFF | OFF |
| MEDIUM SPEED | ON CODED | ON | ON | OFF |
| HIGH SPEED | ON CODED | ON | ON | ON |
| NO. 2 BRAKES | ON CODED | OFF | ON | OFF |
| NO. 3 BRAKES | ON CODED | OFF | OFF | ON |
| NO. 3 BRAKES, PREVENT DOOR OPENING | ON CODED | OFF | ON | ON |
| REVERSE, LOW SPEED | ON CODED | ON | OFF | ON |
| IDENTITY REGISTRATION | | | | | |
| DESTINATION | LENGTH | TONES | | | |
| | | TN1 | TN2 | TN3 | TN4 |
| STATION "B" | LONG | ON | ON | OFF | OFF |
| STATION "B" | SHORT | ON | ON | ON | ON |
| STATION "C" | LONG | ON | ON | ON | OFF |
| STATION "C" | SHORT | ON | OFF | ON | OFF |

FIG. 4.

| TRACTION MOTOR OPERATION | CONTROL WIRES | | | | | |
|---|---|---|---|---|---|---|
| | CW2 | CW1 | CW5 | CW6 | CW7 | CW14 |
| REVERSE | X | | | | | |
| FORWARD | | X | | | | |
| NO. 3 POWER | | X | | | X | |
| NO. 2 POWER | | X | | X | X | |
| NO. 1 POWER | | X | X | X | X | |
| IDLE | | | X | X | X | |
| NO. 1 BRAKES | | | X | X | | |
| NO. 2 BRAKES | | | | X | | |
| NO. 3 BRAKES | | | | | | |
| EMERGENCY TRACK BRAKES | | | | | | X |

X = CONTROL WIRE IS ENERGIZED

INVENTOR.
C. S. WILCOX
BY
Forest W. Hitchcock
HIS ATTORNEY

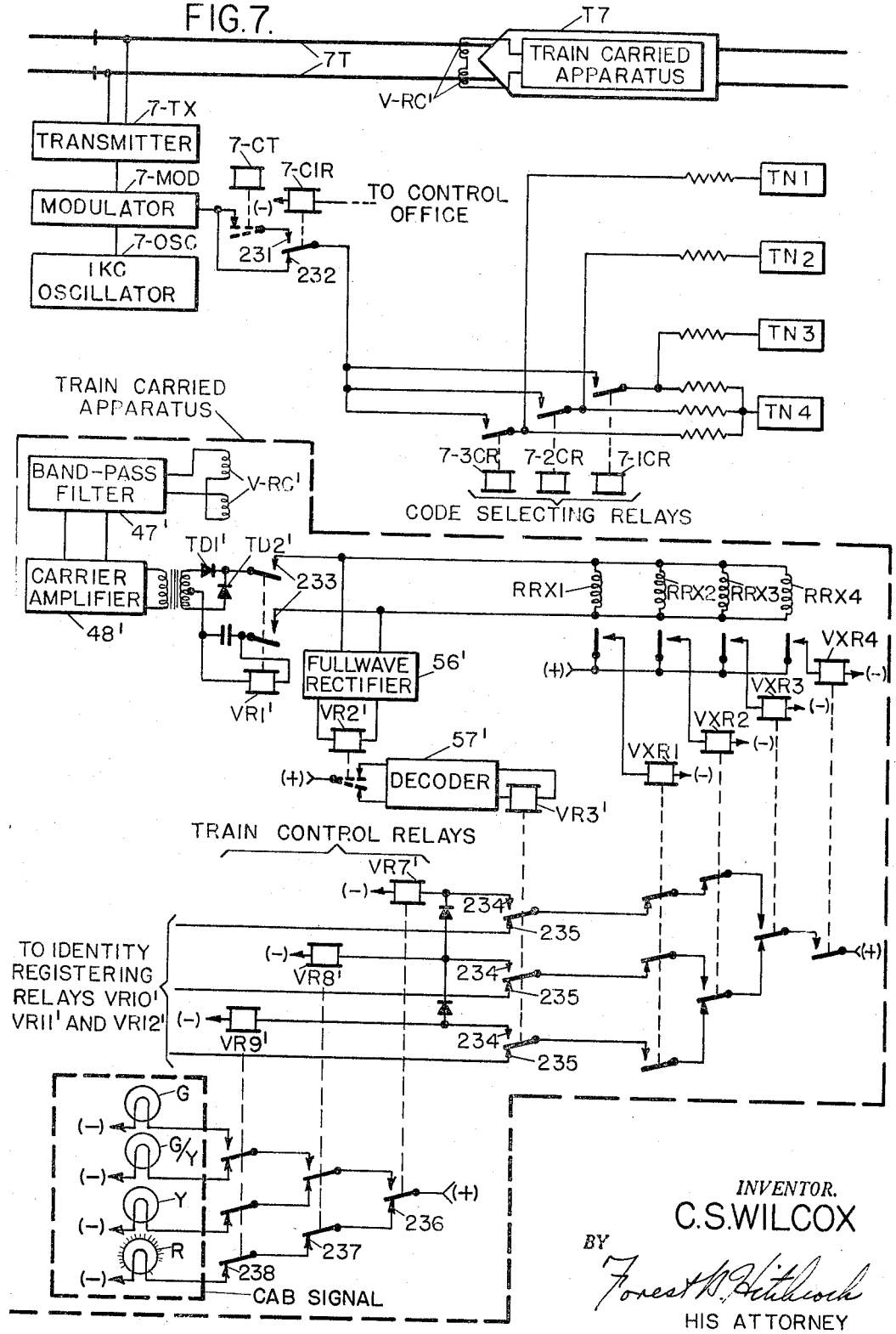

United States Patent Office 3,284,627
Patented Nov. 8, 1966

3,284,627
VEHICLE CONTROL SYSTEM
Clinton S. Wilcox, Rochester, N.Y., assignor to
General Signal Corporation
Filed Sept. 5, 1962, Ser. No. 221,553
17 Claims. (Cl. 246—187)

This invention generally relates to vehicle control systems and more particularly pertains to the control of railway trains during automatic train operation, for example, in accordance with train speed control information communicated from the wayside to the train.

During the normal operation of railway trains, it is obviously necessary that an engineman operate his train depending upon that train's identity; i.e., each particular train, because of its weight, length or other distinguishing characteristics requires distinct operation by the engineman, in order that each train will be properly controlled during its movement along the right of way. Therefore, and particularly during the automatic operation of the trains, for example, in accordance with speed control information communicated from the wayside to the train, it is desirable to render the actual control to be performed on each train dependent upon that train's identity and thus insure proper operation of trains of various identities while they are being automatically controlled.

In view of the above, it is generally proposed in accordance with the present invention, to provide for remotely registering a distinctive identity on a railway train, for example, at the beginning of a move, and to utilize this registered identity as an influencing factor during the subsequent operation of the train, for example, in accordance with speed control information communicated between the wayside and the train over the track rails, as it progresses along its intended move.

In accordance with the present invention, this remote identity registration is accomplished by employing a high frequency track circuit wherein a carrier frequency is applied to the track rails and which is selectively modulated by various combinations of tone frequencies depending upon the particular identity to be registered on the train, and furthermore, this same high frequency track circuit is also utilized to communicate the train speed control information from the wayside to the train distinctive of the desired train speed, and in accordance with which, the driving and braking mechanisms of the train are automatically controlled to operate the train at this desired speed and/or suitable cab signalling could be controlled, if such signalling is desired. Thus, one feature of the present invention is that a single high frequency track circuit is provided whereby wayside control of a plurality of train carried functions is accomplished without requiring the use of a distinct communicating medium for each function to be controlled.

More specifically, this dual purpose communication over the high frequency track circuit is accomplished, in the selected embodiment of the present invention, by coding a selected one of the modulating tone frequencies at a preselected code rate if the modulated carrier frequency information is to be used for controlling the train speed, whereas this selected modulating tone frequency is uncoded when the modulated carrier frequency information is to be utilized for remotely registering an identity on the vehicle. Thus, the high frequency track circuit, in accordance with the present invention, generally provides for more possible wayside to train messages, than are available for example, utilizing conventional coded track circuits heretofore proposed.

As will be pointed out as the description of the invention progresses, the train speed control information (that controlling the driving and braking mechanisms) is automatically communicated to the train, as it progresses along its intended route, in accordance with traffic conditions existing in advance of the vehicle so that more than one train can be properly controlled at a time. However, at certain locations such as curves, stopping locations, etc., the identity of the vehicle is interrogated so that, if required, a more restrictive speed can be called for on the vehicle in accordance with the train identity class.

For example, at curves, it may sometimes be desirable to restrict the speed of only certain trains; e.g., relatively heavy trains, in order to prevent possible derailment of the train which may occur if the train rounds the curve at too high a speed. Thus, in the selected embodiment of the present invention, apparatus is provided for interrogating the identity of a train approaching a curve so that relatively heavy trains are controlled to operate around the curve at a relatively low speed when traffic conditions are such that high speed is permitted for lighter trains. However, it should be pointed out at this time that, in any case, a train is always controlled to the more restrictive speed, whether called for by advance traffic conditions or the train identity.

Similarly, when a train approaches an intended stopping location, the registered train identity is once again interrogated and this information is utilized to select the stopping pattern for the vehicle; e.g., a heavy train will being slowing down farther from the stopping point than a lighter train, and, a long train will be stopped further along the trackway than a relatively short train, in order that all trains will be substantially centered at the intended stopping point, for example, at a station platform.

More specifically, it is proposed to register the desired train identity on the vehicle by selectively shorting and unshorting a plurality of train carried tuned circuits which are resonant at various frequencies. This shorting and unshorting of the train carried tuned circuits is controlled by a plurality of relays selectively energized in various combinations in accordance with the identity registering information communicated to the train over the high frequency track circuit. Provision is also made whereby these relays which control the identity registering tuned circuits are provided with a common stick circuit so that an identity can be readily stored while the train is being operated, and whereby an identity can be easily cancelled from the wayside by communicating an identity cancel code to the train effective to interrupt this common stick circuit.

It is further proposed in accordance with the present invention to control the train speed by utilizing a plurality of train carried flip-flop circuits which are controlled both in accordance with the desired and actual train speeds whereby the driving and braking mechanisms of the train are properly and automatically controlled to operate the train at the desired speed, as called for by the modulated carrier frequency applied to the above mentioned high frequency track circuit. The present invention then further provides for checking that this speed control apparatus is in proper operating condition each time the train is stopped and receives a subsequent proceed control, before the vehicle is permitted to get underway.

In view of the above, a general object of the present invention is to provide wayside control of a railway train utilizing a high frequency track circuit wherein a tone modulated carrier frequency is employed to communicate the control information from the wayside to the train.

Another object of the present invention is to provide wayside control over a plurality of distinct train carried functions by information communicated from the wayside to the train over a common high frequency track circuit.

Another object of the present invention is to provide for both remotely registering an identity on a train and controlling the train to operate at a desired speed in accordance with information communicated from the wayside to the train over a common high frequency track circuit.

A more specific object of the present invention is to utilize a high frequency track circuit supplied with a carrier frequency and selected modulating tone frequencies wherein one of said tone frequencies is either coded or uncoded depending upon which of two train carried functions is to be controlled by the remaining tone modulations.

A further object of the present invention is to provide for remotely registering a distinctive identity on a vehicle and to utilize this registered identity for selectively controlling the vehicle during subsequent operation.

A more specific object of the present invention is to utilize this registered identity to determine the proper speed of the vehicle at wayside curves or the like, and also to select the proper stopping pattern for the vehicle at a predetermined stopping location, during automatic vehicle operation.

A further object of the present invention is to provide speed control on an unmanned vehicle by utilizing a plurality of flip-flop circuits controlled in accordance with both the desired and the actual vehicle speeds for automatically controlling the driving and braking mechanisms of the vehicle to operate it at the desired speed.

A more specific object of the present invention is to provide for checking that the speed control apparatus is functioning properly each time the vehicle is stopped before a subsequent proceed control is effective to start the vehicle in motion.

Other objects, purposes and characteristic features of the present invention will be in part obvious from the accompanying drawings, and in part pointed out as the description of the invention progresses.

In describing the invention, reference will be made to the accompanying drawings in which:

FIGS. 1A through 1E illustrate certain wayside apparatus in accordance with one embodiment of the present invention;

FIGS. 2A through 2D illustrate the train carried apparatus in accordance with this same embodiment of the present invention, for providing automatic train operation;

FIG. 3 illustrates various tone modulating combinations applied to the high frequency track circuit utilized in this same embodiment of the present invention for controlling the driving and braking mechanisms of a railway train and for remotely registering an identity on the train;

FIG. 4 illustrates the manner in which a plurality of control wires, normally provided on the rapid transit cars utilized in the selected embodiment, are selectively energized to provide the various degrees of throttle power and braking necessary to operate the train at the desired speed called for over the high frequency track circuit;

Figure 2A:
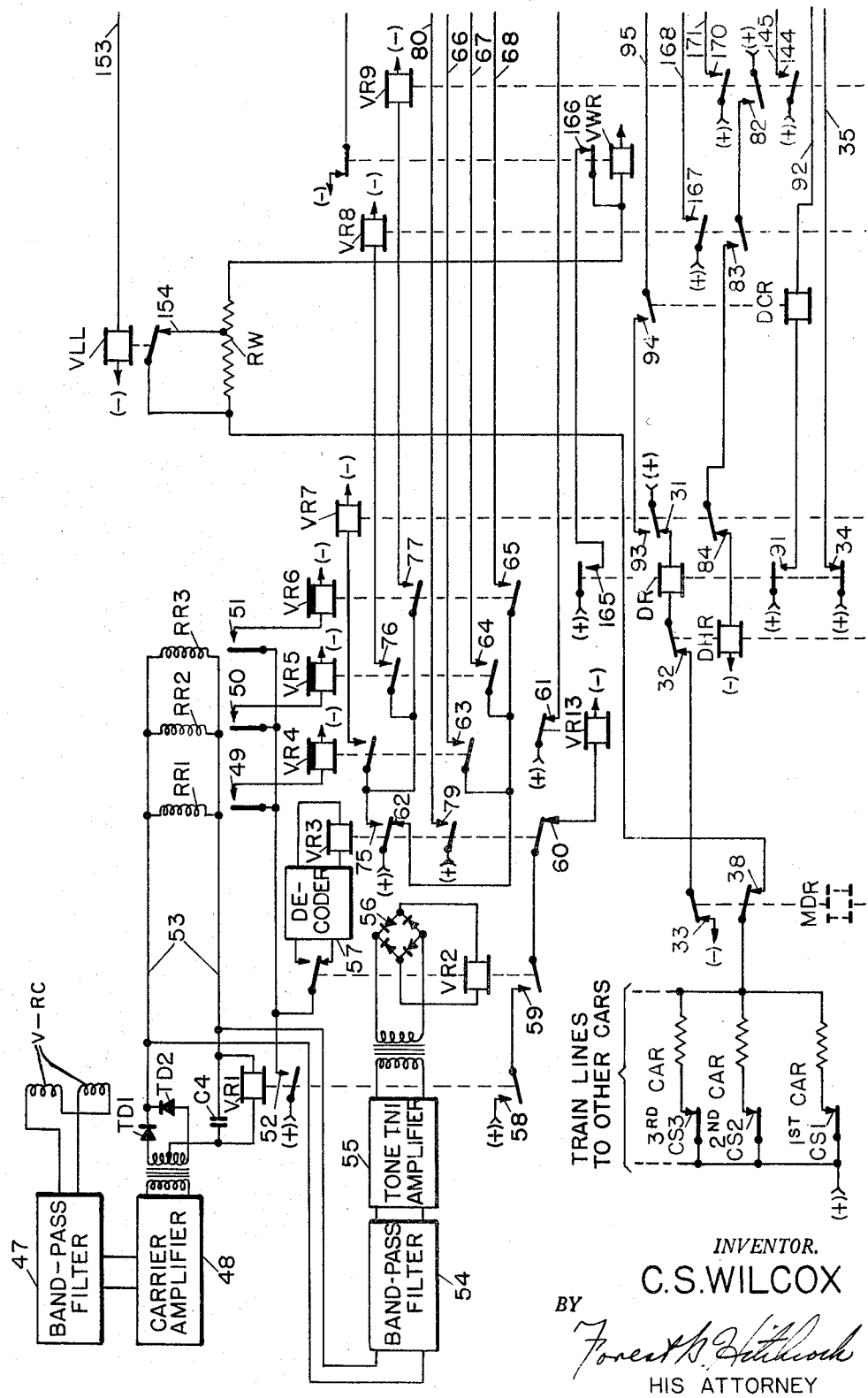

FIG. 5 diagrammatically illustrates the proper arrangement of FIGS. 1A through 1E;

FIG. 6 diagrammatically illustrates the proper arrangement of FIGS. 2A through 2D; and FIG. 7 illustrates a modification in accordance with the present invention whereby an additional check is performed before a wayside to train communication over the high frequency track circuit is considered valid for train control purposes and/or remotely registering an identity on the train.

For the purpose of simplifying the illustration and facilitating in the explanation, the various parts and circuits constituting the embodiment of the invention have been shown diagrammatically and certain conventional illustrations have been employed, the drawing having been made more with the purpose of making it easy to understand the principles and mode of operation, than with the idea of illustrating the specific construction and arrangement of parts that would be employed in practice. Thus, the relays and the contacts are illustrated in a conventional manner and the symbols (+) and (−) are used to indicate connections to the terminals of batteries, or other sources of electric current instead of showing all of the wiring connections to these terminals.

Referring now to FIGS. 1A through 1E, a track layout is illustrated extending to the left of STATION A for connecting STATION A to the other stations of the system. Thus, a track switch SW is provided (see FIG. 1D) whereby the trains leaving STATION A may be routed either to STATION B of FIG. 1A and subsequent stations (not shown) assumed to be located to the left of STATION B over track switch SW in its illustrated "normal" position, or to STATION C (not shown) and subsequent stations over the switch SW in its "reverse" position. This track layout is then divided into a plurality of track sections 10T through 19T each incorporating the high frequency track circuit provided by the present invention for controlling the operation of unmanned rapid transit passenger trains during travel from STATION A to the other stations of the system; i.e., only a single direction of traffic will be discussed in the following description.

In the drawings, the high frequency track circuit apparatus associated with each of the illustrated track sections includes an oscillator unit OSC which provides a carrier frequency output, for example, of one kilocycle (1 kc.). The output tones TN of a plurality of generators (see FIG. 1B and dotted block labelled CODE SELECTING CIRCUITS 19–18) are then utilized to selectively modulate the one kilocycle output from oscillator OSC, at the modulator unit MOD, in accordance with the positions of a plurality of code selecting relays CR which are selectively energized in accordance with the advance traffic conditions existing to the left in the illustrated track layout.

This modulated one kilocycle carrier frequency is then applied across the normal exit end of each of the track sections, by a transmitter TX, so that each section is energized with carrier tone modulations distinctive of the desired train speed on that section (see chart of FIG. 3 for tone modulations utilized and associated train operations). In the selected embodiment of the present invention, it is intended that a low speed control will call for a desired speed of five miles per hour; a medium speed control will call for a desired speed of fifteen miles per hour; and a high speed control will call for a speed of forty-five miles per hour.

Connected across the normal entrance end of each track section (for example, refer to right-hand end of track section 18T in FIG. 1B) is a receiver RX which in the illustrated embodiment is assumed to include an amplifier (e.g. amplifier AMP–RX of FIG. 1B) for amplifying the received track circuit information and which picks up occupany relay OCC if the carrier frequency is received, and a demodulator (e.g., demodulator DM–RX of FIG. 1B) for selectively energizing the relays R2, R3 and R4 depending upon the particular carrier tone modulations appearing in the track rails; i.e., relay R2 is picked up if tone TN2 is received, relay R3 is picked up if tone TN3 is received, and relay R4 is picked up if the tone TN4 is received. These relays OCC, R2, R3 and R4 selectively control the energization of the code selecting relays CR for the next track section to the rear, so that the information applied to each of the high frequency track circuits is properly selected in accordance with advance traffic conditions existing throughout the illustrated track layout.

Referring now to FIG. 1B, the CODE SELECTING CIRCUITS 19–18 are shown in detail and are typical of the code selecting circuits for the remaining track sections (except for those associated with track section 19T of FIG. 1A which is adjacent STATION B, track section 15T of FIG. 1C which includes the curve CU, and track section 10T adjacent STATION A), and therefore, the code selecting circuits shown in block form in the accompanying drawings (e.g. CODE SELECTING CIRCUITS 18–17 of FIG. 1B) may be considered as being exactly the same as the CODE SELECTING CIRCUITS 19–18, shown in detail in FIG. 1B.

In order to permit the control office of FIG. 1A to maintain supervisory control over the train movements on the illustrated track layout, a plurality of stop push buttons STPB are provided, one for each track section (although only those for track sections 19T, 18T and 15T are shown), whereby the control office may manually designate a stop control for any track section that it so desires in order to stop any given train. It has been assumed here that the control office is kept informed as to the location of the various trains in the illustrated track layout by suitable centralized traffic control (CTC) indication circuits (not shown).

Referring now to FIG. 1E, a plurality of identity registering push buttons are illustrated whereby an operator in the control office manually designates the desired identity to be registered on a train before it departs from the STATION A, by selectively energizing the code selecting relays O–CR1 through O–CR5, associated with track section 10T, which select the identity registering code to be communicated to the train over the high frequency track circuit for track section 10T. This remote identity registration will be described in detail, as the description progresses.

As previously mentioned, FIG. 3 of the drawings illustrates the particular tone combinations utilized to establish this remote identity registration on the train. Although only four different identity registrations have been considered, it should be obvious that more identity registrations are possible and it should furthermore be understood that a greater number of tones could be utilized, if desired, to extend the number of possible identity registrations and/or different degrees of train control, without in any manner departing from the spirit or scope of the present invention.

In the selected embodiment of the present invention, the identity thus registered on the train is utilized for three different purposes: (1) to automatically operate the track switch SW of FIG. 1D depending upon the destination of the train; (2) to determine the proper speed of the train over the curve CU assumed to be present in track section 15T of FIG. 1C; and (3) to select the proper stopping pattern for the train at its intended stopping location; e.g., STATION B of FIG. 1A.

Referring to FIGS. 1A, 1C and 1D of the accompanying drawings, wayside identity interrogating apparatus is provided on the approach to each of these three locations, for interrogating the identity registered on the train carried tuned circuits TC of FIG. 2B. This wayside identity interrogating apparatus includes a wayside coil IL which is disposed along the trackway in such a manner that it inductively coacts with the train carried identity registering tuned circuits TC. Each of these wayside coils IL is connected to an associated identity receiver IRX which is assumed here to include a sweep frequency oscillator (not shown) which scans the frequency range of the train carrier tuned circuits and which selectively energizes certain wayside identity registration relays in accordance with the train carried identity.

More specifically, wayside coil 12–IL is situated in advance of the track switch SW of FIG. 1D and is connected to identity receiver 12IRX which control the energization of route selecting relays CD and BD for automatically operating the track switch SW in accordance with the destination identity registered on the train carried coils TC; i.e., relay BD is picked up if the approaching train is bound for STATION B and relay CD is picked up if the train is bound for STATION C. Similarly, wayside coil 14–IL is disposed on the approach to the curved portion CU of track section 15T (see FIG. 1C) and is connected to identity receiver 14–IRX which picks up wayside weight registering relay 14–WWR, if the approaching train is heavyweight. The relay 14–WWR is then included in the code selecting circuits for track section 15T whereby the weight identity of a train approaching track section 15T determines the particular train control tone modulations applied to the track rails of track section 15T, whereas, wayside loop 18–IL is disposed on the approach to track section 19T (see FIG. 1A) and is connected to identity receiver 18–IRX which controls the energization of wayside weight registering relay 19–WWR and length registering relay 19–WLR which are then connected in the code selecting circuits for track section 19T, whereby the stopping pattern for the trains at STATION B; i.e., the train control information applied to track section 19T, is determined in accordance with both the length and weight identity of trains approaching track section 19T.

Referring now to FIGS. 2A through 2D, the information communicated to the vehicle over the high frequency track circuit is inductively received by receiver coils V–RC of FIG. 2A. Depending upon whether tone TN1 is coded or uncoded; i.e., whether the received information is for train control or identity registration respectively, the remaining tones TN2, TN3 and TN4 cause selective energization of either the train control relay VR7, VR8 and VR9 of FIG. 2A to select one of the speed selecting relays LSR, MSR and HSR of FIG. 2B, or else selectively energize the identity registering relays VR10, VR11 and VR12 of FIG. 2B which controls the shorting and unshorting of the train carried tuned circuits TC, depending upon the desired identity to be registered on the vehicle.

After the desired speed has been selected, by the energization of one of the speed selecting relays LSR, MSR, or HSR of FIG. 2B, the actual control of the train speed is provided by a plurality of flip-flop circuits FF5, FF7, FF15, FF17, FF45 and FF47 of FIGS. 2C and 2D. These flip-flop circuits FF then operate a plurality of speed relays 5R through 47R to control the selective energization of a plurality of control wires CW which extend to the TRAIN TRACTION MOTOR CONTROL APPARATUS of FIG. 2D and which control (1) whether the train is to be driven forward or reverse, (2) whether the motors are connected for supplying driving horsepower or dynamic braking, and (3) the degree of power or braking being developed at the motors (see FIG. 4), whereby the train is properly operated at the desired speed called for by the high frequency track circuit information.

As will be pointed out in detail hereinafter, this plurality of flip-flop circuits FF is controlled in accordance with both the desired train speed called for by the speed selecting relays LSR, MSR and HSR of FIG. 2B and the actual train speed which is detected by an axle driven frequency generator ADFG of FIG. 2C, and, which is registered on a plurality of resonant reed relays RR4 through RR47 of FIGS. 2C and 2D. The axle driven frequency generator ADFG puts out a frequency analog of the actual train speed and each of the resonant reed relays RR4 through RR47 have a resonant frequency corresponding to an actual train speed, in miles per hour, which is the same as the numerical designation for that relay; e.g., resonant reed relay RR4 will only close its associated contact when supplied with a frequency indicative of a train speed of four miles per hour, relay RR5 will only close its associated contact when supplied with a frequency analog of five miles per hour, etc.

Certain speed control check apparatus is also provided, including relays SCR and OSCR of FIG. 2D and oscillators OSC5 through OSC49 which check that the above-mentioned speed control circuits are in proper operating order each time the train is stopped and a proceed control is subsequently received, before the train is permitted to move, as will be described in detail hereinafter.

In the selected embodiment, the vehicles being controlled have been assumed to be rapid transit passenger trains operating between loading and unloading stations A, B, and C. Thus, the train carried apparatus of FIGS. 2A through 2D include certain door control circuits for properly opening and closing of the car doors in order to permit the safe loading and unloading of passengers; e.g., the car doors are kept closed as long as the train is in motion, they are automatically opened when the train arrives at its destination, and the doors are checked closed before the train can get underway.

In addition to providing for remotely registering an identity on the vehicle, in accordance with the destination and length of the train, the present invention also provides for automatically registering the weight identity of the vehicle each time the vehicle is stopped, for example, to take on passengers. More specifically, the weight identity is automatically registered by means of a plurality of car switches CS (see FIG. 2A) one on each car, which are actuated depending on the displacement of the car springs which in turn is dependent upon the loading of a particular car; i.e., a switch CS is opened if the particular car is heavily loaded. These car switches CS then control the energization of weight registering relay VWR of FIG. 2A which selectively controls the shorting and unshorting of a tuned circuit TCW of FIG. 2B, in order that the weight identity of the train may be properly stored. In the selected embodiment of the present invention, it is intended that a train will be classified as "heavy" if more than half of the cars are heavily loaded. For reasons to be explained hereinafter, an adjustable resistance RW is connected in series in the energizing circuit for weight registering relay VWR of FIG. 2A, and this resistance RW is varied in accordance with the known length identity of the train which has been remotely registered thereon by the information communicated to the train over the high frequency track circuit.

Before beginning a detailed description of the operation of the illustrated embodiment of the present invention, the normal conditions of the circuit apparatus will be discussed, assuming that receiver 20–RX of FIG. 1A is receiving a high speed tone communication via the rails of track section 20T (partially shown in FIG. 1A) and that track layout of FIGS. 1A through 1E is unoccupied except for the unloaded train T1 which is standing to the right of STATION A ready to be put into service; i.e., moved up to the platform of STATION A to take on passengers.

*Normal conditions*

Under the assumed conditions, the relays 20–OCC, 20–R2, and 20–R4, 20–R3 of FIG. 1A are all picked up and cause code selecting relay 19–3CR to be energized by a circuit extending from (+), through front contacts 10, 11 and 12 of relays 20–OCC, 20–R2 and 20–R3 respectively, back contacts 13, 14, 15 and 16 of relays 19–6CR, 19–5CR, 19–1CR and 19–2CR respectively, along wire 17 extending between FIGS. 1A and 1B to the control office, through front contact 18 of block relay 19–BL, and to (−). With relay 19–3CR picked up, a high speed carrier modulation is then applied to the left-hand end of track section 19T. More specifically, the picking up of code selecting relay 19–3CR causes tones TN2, TN3, and TN4 to be applied, through front contact 19 of relay 19–3CR, to the modulator 19–MOD along with tone TN1 which is coded at front contact 20 of code transmitter 19–CT. The one kilocycle carrier frequency from oscillator 19–OSC is then modulated by this selected combination of tone frequencies and is applied, by transmitter 19–TX, to the left-hand end of the track section 19T, over wires 21.

With track section 19T unoccupied, the modulated track circuit information is then applied along wires 22, between FIGS. 1A and 1B, as input to receiver 19–RX of FIG. 1B, so as to cause pick up of relays 19–OCC, 19–R2, 19–R3 and 19–R4. The code selecting relay 18–3CR is then also energized from (+), over front contacts 23, 24 and 25 of relays 19–OCC, 19–R2 and 19–R3 respectively, back contacts 26 and 27 of relays 18–6CR and 18–2CR respectively, along wire 28 extending to the control office, through front contact 29 of block relay 18–BL, and to (−). A high speed control is thus also applied to the left-hand end of track section 18T, over wires 30 extending between FIGS. 1B and 1A.

In substantially the same manner, the remaining track sections 17T through 11T are each supplied at its left-hand end, with a similar high speed train modulation; i.e., tone TN1 (coded) and tones TN2, TN3 and TN4 uncoded.

Referring now to FIG. 1E, the relays 11–OCC, 11–R2, 11–R3 and 11–R4 are now all picked up to indicate that traffic conditions are clear for a move onto track section 11T. However, as shown in FIG. 1E, modulation 10–MOD is disconnected from the CODE SELECTING CIRCUITS 11–10, and therefore, section 10T is unmodulated since the train T1, which is standing on track section 10T to the right of the platform at STATION A must first receive its proper identity registration and then be spotted at STATION A to take on the passengers for the next train move. Before considering how an identity registration is made on the train T1, and subsequently, how the train is loaded and dispatched towards its selected destination, the normal conditions of the train carried apparatus of FIGS. 2A through 2D will be set forth.

Referring to FIG. 2A, the door control relay DR is normally energized, while the train is standing, by a circuit including a back contact 31 of train control relay VR7, back contact 32 of door hold relay DHR, and back contact 33 of motion detector relay MDR. Therefore, the doors of the train are opened due to the picking up of the car door relays CDR (e.g. relay CDR1 of FIG. 2B) by a circuit from (+) in FIG. 1A, over front contact 34 of door control relay DR, along wire 35 between FIGS. 1A and 1B, over the train line 36 connecting each of the cars of the train, and to (−). For example, with the car door relay CDR1 picked up, as illustrated in FIG. 2B, door open control wire DO is energized, to cause the doors of the first car to be opened, over front contact 37 of relay CDR1.

As will be pointed out in detail hereinafter, each time the train is stopped, its weight classification is automatically registered on weight relay VWR of FIG. 2A. More specifically, the energizing circuit for weight relay VWR extends from (+), through the contacts of car spring actuated switches CS1, CS2, CS3, etc. which are connected in multiple and which are opened when the associated cars are heavily loaded, through back contact 38 of motion detector relay MDR, through resistor RW, and to (−). Under the assumed conditions (train T1 unloaded), the spring operated switches CS1, CS2, etc. will all be closing their associated contacts and thereby connecting a minimum resistance in the energizing circuit for weight relay VWR so that the magnitude of current now flowing in this energizing circuit is sufficient to cause pick up of the relay VWR (as shown) which indicates that the train T1 has not as yet been loaded.

Referring to FIG. 2C, the flip-flop circuit FF5 includes transistors 5Q1 and 5Q2 and operates a relay driver circuit, including transistor 5Q3, which controls the operation of speed relay 5R. With the train T1 standing still, the transistor 5Q1 is normally conducting due to the negative voltage applied to the base of transistor 5Q1 by a circuit extending from (−), through back contact 39 of motion detector relay MDR, isolating diode 5D1, and resistor 40. Transistor 5Q1 is of the P-N-P type, and therefore, its collector is driven positive to cut off the transistor 5Q2. With transistor 5Q2 cut off, the base of the relay driver transistor 5Q3 is negative and the resulting collector current at transistor 5Q3 causes pick up of speed relay 5R. In substantially the same manner, the speed relays 7R, 15R, 17R, 45R and 47R are also normally picked up by the similar operation of the associated flip-flop and relay driver circuits of FIGS. 2C and 2D, the left-hand sides of these flip-flop circuits are connected to (−) through diodes 7D1, 15D1, etc. which perform the same function as diode 5D1 previously discussed.

Since no train control information is now being received on the train T1, the track brake control relay TBR, of FIG. 2B is now dropped away and the control wire CW14 of FIG. 2D is therefore energized to call for application of the emergency track brakes. Furthermore, the train brake control relays 2BR and 3BR of FIG. 2C which control the dynamic braking at the train traction motors, as will be described, are also deenergized at this time.

*Remote identity registration*

Referring to FIG. 1E, it will now be assumed that the control office lever COL is operated from the MANUAL to the IDENTITY position for remotely registering an identity on the train T1, distinctive of the intended train destination and known length classification. Assuming now that the train T1 is a relatively short train destined for those stations reached by travel over track switch SW in its illustrated "normal" position, e.g. STATION B of FIG. 1A, identity push buttons SPB and BPB of FIG. 1E are simultaneously depressed and cause code selecting relay O-CR3 to be picked up over a circuit extending from (+), through the control office lever COL in its IDENTITY position, wire 41, contacts 42 of identity push button SPB, contacts 43 of identity push button BPB, and to (−).

This picking up of code selecting relay O-CR3 causes tones TN2, TN3 and TN4 to be simultaneously applied to the modulator 10-MOD, over front contact 44 of code selecting relay O-CR3 and back contact 45 of proceed relay PR, along with uncoded tone TN1 which is applied to the modulator 10-MOD over back contact 46 of relay CIR. The one kilocycle carrier frequency from oscillator 10-OSC is then modulated by this combination of tones and the modulated carrier is applied, by transmitter 10-TX, to the left-hand end of track section 10T. Referring to FIG. 3 it will be noted that this combination of tones corresponds to the desired identity registration on the train T1; i.e., a short train destined for those stations reached over track switch SW in its "normal" position; e.g. STATION B.

This modulated track circuit information, applied to the left-hand end of track section 10T is then inductively received by receiver coils V-RC of FIG. 2A mounted on the head end of the train T1, as shown in FIG. 1E. Referring to FIG. 2A, the received modulated carrier frequency then passes through the band-pass filter 47 to the carrier amplifier 48, where the received signal is amplified to the desired signal strength. This amplified signal is then demodulated by diodes TD1 and TD2 and the demodulated tones then drive a plurality of resonant reed relays RR1, RR2, and RR3 depending upon the particular combination of tones included in the received signal.

More specifically, relay RR1 is resonant at the frequency of tone TN2 and therefore closes its associated contact 49 when tone TN2 is received, while relays RR2 and RR3 are resonant at the frequencies of tones TN3 and TN4 respectively. Thus, under the assumed condition, the tones TN2, TN3 and TN4 are all being received and therefore the resonant reed relays RR1, RR2 and RR3 are each energized to close the associated contacts 49, 50 and 51 respectively.

In addition, the rectified carrier energy is appearing across capacitor C4 is used to operate the carrier off relay VR1 which is picked up, to close its front contact 52 as long as the carrier frequency is being received, for applying pick up energy to the tone relays VR4, VR5 and VR6 of FIG. 2A. Thus, under the assumed conditions, the tone relays VR4, VR5 and VR6 are all picked up over front contact 52 of carrier off relay VR1 and the associated contacts 49, 50 and 51 of resonant reed relays RR1, RR2 and RR3 respectively.

The demodulated tones appearing across wires 53 are also applied as input to a band-pass filter 54 which permits only the tone TN1 to pass through. This tone TN1 is then amplified at amplifier 55, is rectified at full-wave rectifier 56, and, causes pick up of the tone relay VR2, by the resulting rectifier current flow.

Since the tone TN1 is not being coded (an identity registration is being made) relay VR2 is steadily energized and decoding relay VR3 at the output of decoder 57, is dropped away so that identity cancel relay VR13 is picked up over front contacts 58 and 59 of relays VR1 and VR2 respectively, and back contact 60 of decoding relay VR3. With identity cancel relay VR13 picked up, the common stick circuit for identity registering relays VR10, VR11 and VR12 of FIG. 2B is now interrupted at back contact 61, and therefore, any identity previously registered on the tuned circuits TC1, TC2 and TC3 would now be cancelled.

The new identity; i.e., a short train bound for STATION B, is now registered on the identity registering relays VR10, VR11 and VR12 by the selective energization of these relays over back contact 62 of decoding relay VR3 and the respective front contacts of relays VR4, VR5 and VR6. More specifically, since relays VR4, VR5 and VR6 are now all picked up (tones TN2, TN3 and TN4 being received) to close their associated front contacts 63, 64 and 65 respectively, the identity registering relays VR10, VR11 and VR12 are each energized along wires 66, 67 and 68 respectively extending between FIGS. 2A and 2B.

As previously mentioned, relays VR10, VR11 and VR12 control the selective shorting and unshorting of the identity registering tuned circuits TC1, TC2 and TC3 of FIG. 2B so that with relays VR10, VR11 and VR12 picked up, to open their respective back contacts 69, 70 and 71, the capacitors C1, C2 and C3 are unshorted, so that together with the inductors L1, L2 and L3 they now form resonant circuits each having a different resonant frequency, the frequency combinations of which are distinctive of the desired train identity to be registered (see FIG. 3).

*Station spotting*

Assuming now that the identity has been properly registered on the train T1, as previously described, the control office lever COL is now moved to the STATION SPOTTING position for operating the train T1 up to the platform at STATION A ready to receive the passengers desiring to travel to STATION B, for example. Thus, when the lever COL is moved to the STATION SPOTTING position, relay CIR is now energized through diode WD1, and control is shifted to the SPOTTING LEVER SL of FIG. 1E which is utilized to properly spot the trains at the platform of STATION A. Since the lever SL is normally in its STOP position, the code selecting relay O-CR6 will now be picked up to apply a No. 3 brake control to the track section 10T. More specifically, tones TN3 and TN4 are now applied to modulator 10-MOD over front contact 72 of code selecting relay O-CR6 and back contact 45 of proceed relay PR, while the tone TN1 is applied to the modular via front contacts 73 and 74 of relay CIR and code transmitter 10-CT respectively and back contact 45 of relay PR; i.e., tone TN1 is now coded to distinguish the train control communication from an identity registering message (see FIG. 3). This No. 3 brake control is then applied to the left-hand end of track section 10T and is received on the train T1 by the receiver coils V-RC.

Since tone TN1 is now coded, tone relay VR2 of FIG. 2A now alternately closes its front and back contacts and thereby energizes decoder 57 in the proper manner for picking up decoder relay VR3. This picking up of relay VR3 opens its back contact 62, in the pick up circuits for the identity registering relays VR10, VR11 and VR12 of FIG. 2B, and closes its front contact 75 so that the received information will now be used for energizing train control relays VR7, VR8 and VR9, instead of for identity registration. Under the assumed condition; i.e., a No. 3 brake control is now being received, only tone relays VR5 and VR6 are picked up and cause pick-up of train control relays VR8 and VR9 over front contact 75 of decoder relay VR3 and front contacts 76 and 77 of tone relays VR5 and VR6 respectively, to call for a No. 3 brake application on the train T1. It should be noted in FIG. 2A that the tone relays VR4, VR5 and VR6 are made slow pick-up, in order to allow the decoding relay VR3 to be picked up before these tone relays can be picked up, which insures that the registered identity will not be altered when changing from an identity registering condition to a train control condition.

The picking up of decoding relay VR3 also interrupts the energizing circuit for identity cancel relay VR13, at back contact 60, so that relay VR13 again closes its back contact 61 and thereby completes the common stick circuit for the identity registering relays VR10, VR11 and VR12. These identity registering relays are made sufficiently slow in dropping away so as to bridge the sum contact crossover time for relays VR3 and VR13 to insure that the desired train identity registration will be properly stored on the vehicle.

As previously pointed out, the train T1 is standing with the emergency track brakes applied due to the deenergization of the track brake control relay TBR of FIG. 2B and the resulting energization of control wire CW14 of FIG. 2D over back contact 78 of relay TBR. However, when decoding relay VR3 picks up as discussed above, to indicate that train control information is now being received, the track brake control relay TBR is now energized, to remove the emergency track brakes, by a circuit extending from (+) in FIG. 2A, through front contact 79 of decoding relay VR3, along wire 80 between FIGS. 2A and 2B, through back contact 81 of speed relay 49R, and to (—).

Referring to FIG. 2A and the chart of FIG. 3, the particular brake control now being received is that which is utilized for braking the trains between stations, as will be described, as opposed to the station stop brake control utilized for stopping the trains at the station platforms to discharge and take on passengers. Thus, this particular brake control; i.e., tone TN1 coded and tones TN3 and TN4 uncoded, in causing pick up of train control relays VR8 and VR9, causes door hold relay DHR of FIG. 2A to be energized by a circuit extending from (+), over front contacts 82 and 83 of relays VR9 and VR8 respectively, back contact 84 of relay VR7, and to (—). Furthermore, the No. 2 brake control relay of FIG. 2C is now energized over front contacts 85 and 86 of train control relay VR9, while the No. 3 brake control relay 3BR remains in its dropped away position, because of the opening of front contact 87 of door hold relay DHR, and therefore, calls for No. 3 braking on the train T1.

The picking up of door hold relay DHR now interrupts the normal energizing circuit for door control relay DR of FIG. 2A, at back contact 32 of relay DHR and the relay DR is therefore dropped away to deenergize the car door control relays CDR on the individual cars of the train for causing the doors of these cars to be closed. More specifically, the dropping away of relay DR opens its front contact 34 and thereby deenergizes wire 35 extending between FIGS. 2A and 2B to the car door control relays. For example, relay CDR1 of FIG. 2B is now deenergized and causes the door close control wire DC, to be energized, over back contact 88 of relay CDR1, so that the doors of the first car are now operated to their closed positions. Similarly, the deenergization of train line 36 causes the doors on the remaining cars to be closed.

Referring to FIG. 2B, the door switches DS are train lined together in series and close their associated contacts when the individual cars register in the closed position. Thus, the door switch DS1 closes its front contact 89 when the doors of the first car are closed; the door switch DSL closes its front contact 90 when the doors of the last car are closed, and, the symbol XX is intended here to represent the series connection of the remaining door switches DS mounted on the doors of the intervening cars. As soon as all of the door switches DS are closed, the door check relay DCR of FIG. 2A is now energized by a circuit extending over back contact 91 of door control relay DR, along wire 92 between FIGS. 2A and 2B, through the series connected contacts 89 and 90 of door switches DS1 and DSL respectively (as well as similar contacts on the door switches for the intervening cars), and to (—).

In order to operate the train T1 towards the platform of STATION A, the SPOTTING LEVER SL is now moved to its FORWARD position wherein code selecting relay O-CR1 is now picked up (along with relay CIR) to apply a low speed control message to the left-hand end of track section 10T; i.e., uncoded tone TN2 along with coded tone TN1.

The reception of this low speed control on the train T1, then causes pickup of train control relay VR7 and dropaway of the other train control relays VR8 and VR9. Provided that the door check relay DCR picks up, as previously described, the low speed selecting relay LSR of FIG. 2B is now energized over front contact 93 of train control relay VR7, front contact 94 of door check relay DCR, wire 95 between FIGS. 2A and 2B, and to (—).

The train brake control relays 2BR and 3BR of FIG. 2C are now both energized, when the train control relay VR7 picks up, to permit the traction motors to be connected for supplying driving power, as will be described. More specifically, relay 2BR is energized over front contacts 96 and 97 of relay VR7, while relay 3BR is energized over front contacts 96 and 98 of relay VR7, and back contact 87 of door hold relay DHR; the relay DHR being dropped away by the opening of back contact 84 of relay VR7. This picking up of brake control relays 2BR and 3BR then causes control wire CW6 of FIG. 2D to be energized over front contact 99 of relay 3BR, along wire 100 between FIGS. 2C and 2D, over back contact 101 of power relay 3PR, and front contact 102 of speed relay 47R; control wire CW5 to be energized over front contact 103 of relay 3BR, front contact 104 of relay 2BR, along wire 105 between FIGS. 2C and 2D, over front contact 106 of speed relay 17R, back contact 107 of power relay 2PR, and front contact 108 of speed relay 47R; and, control wire CW7 to be energized over front contact 109 of relay 3BR, front contact 110 of relay 2BR, front contact 111 of speed relay 7R, along wire 112 between FIGS. 2C and 2D, and front contacts 113 and 114 of speed relays 17R and 47R respectively. Referring to FIG. 4, the traction motors are now connected in the idling or "coast" condition. However, as mentioned previously, before the train T1 is permitted to get underway, a check is first made of the speed control apparatus illustrated in FIGS. 2C and 2D.

*Speed control check*

Under normal conditions, the speed relays 5R, 7R, 15R, 17R, 45R are all picked up. However, when speed selecting relay LSR picks up to indicate that a low speed control has been received, back contact 115 of relay LSR is opened to disconnect (+) from wire 116 which extends between FIGS. 2D and 2C to the oscillators OSC5 through OSC49. It is intended here that such disconnecting of (+) from wire 116 then allows the oscillators OSC5 through OSC49 to supply their respective output frequencies to amplifier AMP1 of FIG. 2C. For example, this disconnecting of wire 116 from (+) might represent ungrounding the oscillators OSC5 through OSC49 to permit them to supply their respective frequencies to amplifier AMP1. The motion detector relay MDR is now picked up by the rectified output from amplifier AMP1 and thereby closes its front contact 117.

The oscillator OSC5 generates a frequency which is the same as the output of axle driven frequency generator ADFG, at five miles per hour, and at which resonant reed relay RR5 closes its contact 118 to connect the base of transistor 5Q2 to (−), along wire 119 in FIGS. 2C and 2D, while the base of transistor 5Q1 is disconnected from (−) by the opening of back contact 39 of the motion detector relay MDR. This causes the flip-flop FF5 to be flipped to that condition wherein transistor 5Q2 is conducting and transistor 5Q1 is cut off. The resulting collector current flow in transistor 5Q2 then causes the base of the relay driver transistor 5Q3 to go positive and the speed relay 5R to subsequently drop away. Similarly, the output frequencies of oscillators OSC7, OSC15, etc. cause the associated flip-flop circuits FF7, FF15, etc. each to be flipped to that condition wherein the relays 7R, 15R, etc. are all dropped away. In addition, the output frequency of oscillator OSC49 is high enough to pass through the high pass filter HPF49 of FIG. 2C and causes pick up of speed relay 49R.

Under these conditions, speed check relay SCR of FIG. 2D is now energized from (+) in FIG. 2C, over front contact 117 of motion detector relay MDR, back contacts 120 and 121 of speed relays 5R and 7R respectively, wire 122 between FIGS. 2C and 2D, back contacts 123, 124, 125, and 126 of speed relays 15R, 17R, 45R and 47R respectively, front contact 127 of relay 49R, and to (−). With speed check relay SCR picked up, wire 116 extending between FIGS. 2D and 2C, to the oscillator OSC5 through OSC49, is once again energized with positive energy, over front contact 128 of relay SCR, so that the oscillators OSC5 through OSC49 are again shut off. This causes motion detector relay MDR to drop away for connecting the base of transistor 5Q1, along with the corresponding left-hand transistors in the other flip-flop circuits, to (−), over back contact 39 of relay MDR. This then causes the flip-flop circuits FF5 through FF47 to be returned to the normal conditions wherein speed relays 5R, 7R, 15R, etc., are again picked up for interrupting the energizing circuit for the speed check relay SCR of FIG. 2D.

However, when the motion detector relay MDR drops away to close its back contact 129, an energizing circuit is then completed for the zero speed check relay OSCR of FIG. 2D, extending from (+) in FIG. 2D, through front contact 130 of speed selecting relay LSR, front contact 131 of speed check relay SCR which is slow to drop away, along wire 132 between FIGS. 2D and 2C, through back contact 129 of motion detector relay MDR, and to (−). As soon as the zero speed check relay OSCR picks up, a stick circuit is then established for relay SCR over front contacts 133 and 134 of relays OSCR and SCR respectively, while a corresponding stick circuit is also established for relay OSCR over its own front contact 135, front contact 131 of relay SCR, and front contact 130 of relay LSR.

Once this speed check has been performed; i.e., speed check relay SCR has been picked up and the speed relays 5R, 7R, etc., have been returned to their normal picked up positions, the No. 1 power relay 1PR of FIG. 2D is now energized, to initiate the desired low speed operation of the train T1, by a circuit extending from (+) in FIG. 2C, over front contact 136 of relay 5R, along wire 137 between FIGS. 2C and 2D, over front contact 138 of relay 15R, front contact 139 of relay LSR, front contacts 140 and 141 of relays 45R and SCR respectively, and to (−). This picking up of the No. 1 power relay 1PR now causes energization of the forward control wire CW1 of FIG. 2D over front contact 142 of relay 1PR and back contact 143 of reverse relay RR, so that the traction motors of the train are now connected for driving the train T1 towards the platform of STATION A at the desired low speed which has been assumed to be five miles per hour, in the selected embodiment of the present invention.

The train T1 is then controlled to operate at this nominal five miles per hour speed, as will be described hereinafter, until the spotting lever SL of FIG. 1E is operated to its center STOP position for stopping the train T1 when it is properly spotted at the platform of STATION A. Thus, when the lever SL is moved to its STOP position, code selecting relay O-CR6 is again energized to close its front contact 72 for applying a No. 3 brake control to the left-hand end of track section 10T which calls for the No. 3 train brakes to apply (relay 3BR dropped away) and the doors to remain closed (relay DHR picks up) in accordance with the chart shown in FIG. 3.

In the event that the train overruns the platform of STATION A, or if the operator wishes to back the train up, the SPOTTING LEVER SL is moved to the right-hand or REVERSE position, and thereby causes pick-up of code selecting relay O-CR7 (along with relay CIR). This picking up of relay O-CR7 causes tones TN2 and TN4 to be applied to modulator 10-MOD (along with coded tone TN1) and represents a low speed reverse control for the train T1. More specifically, when this particular control message is received on the train, train control relay VR7 will be picked up to energize the low speed selecting relay LSR of FIG. 2B, relay VR9 will be picked up, and relay VR8 dropped away. Under these conditions, reverse relay RR of FIG. 2B is then picked up, over front contact 144 of relay VR9, along wire 145 between FIGS. 2A and 2B, front contact 146 of relay LSR, and back contacts 147 and 148 of relay MSR and HSR respectively, and closes its front contact 149 to cause energization of the reverse motor control wire CW2 of FIG. 2D, when the No. 1 power relay is subsequently picked after the speed control check has been performed, as previously described.

Assuming that the train T1 has been properly spotted at STATION A, the control office lever COL of FIG. 1E is now moved to its LOAD position wherein code selecting relay O-CR5 is picked up (along with relay CIR) to cause the station stop brake control to be applied to the left-hand end of track section 10T to permit the doors of the train to be opened; i.e., tone TN4 is applied to modulator 10-MOD over front contact 150 of relay O-CR5 (along with coded tone TN1).

Referring to FIG. 2A, the reception of this station stop brake control causes energization of train control relay VR9 over front contact 77 of tone relay VR6, so that brake control relay 3BR remains dropped away, brake control relay 2BR is maintained in its picked up position, and door hold relay is now dropped away due to the opening of front contact 83 of train control relay VR8. Provided that the train T1 is motionless, i.e., motion detector relay MDR drops away, door control relay DR of FIG. 2A can again be picked up over the previously described energizing circuit, so that the doors of each car on the train T1 are now opened, to permit the loading of passengers desiring to board the train.

Depending upon the loading which is received on train T1, the spring actuated switches CS of FIG. 2A will then detect the number of cars that are heavily loaded, as previously described, so that weight registering relay VWR either remains in its picked up position (as illustrated) to register that the train is lightweight or else it is dropped away, to register that the train is of heavyweight classification. As mentioned previously, it is intended in the illustrated embodiment that the train will be classified as lightweight (relay VWR picked up) if less than half the train cars are heavily loaded, and otherwise, classified as heavyweight (relay VWR dropped away). Referring to the energizing circuit for weight registering relay VWR, the resistor RW is made adjustable in accordance with the registered length identity of the train, so that relay VWR properly registers the weight classification for different length trains. Thus, when the train is short, relay VLL of FIG. 2A is deenergized (as shown) and shunts out a portion of resistor RW, so that the opening of fewer of the spring actuated switches CS are necessary to decrease the energizing current to relay VWR from the empty train value to below the dropaway value, whereas, if the train is long, relay VLL would be energized over a circuit extending from (+) in FIG. 2B, over front contact 151 of relay VR10, back contact 152 of relay VR12, along wire 153 between FIGS. 2B and 2A, and to (−). This picking up of relay VLL opens its back contact 154 and thus places the maximum resistance of resistor RW in series in the energizing circuit of relay VWR and thereby requires that a greater number of cars be heavily loaded before that train is classified as heavyweight.

Referring to FIG. 1E again, the actuation of lever COL to its LOAD position furthermore causes energization of wayside timer WT1 which is assumed here to be preset in accordance with the time schedule for the various trains, so that it closes its front contact 155 for purposes to be described hereinafter, when the correct leaving time for train T1 arrives.

Speed control

As mentioned previously, the train T1 is controlled to operate at the desired speed called for by the modulated carrier frequency in the high frequency track circuits by the various flip-flop circuits FF5 through FF47 of FIGS. 2C and 2D. More specifically, when a low speed control is received (desired speed is five miles per hours), flip-flop circuits FF5 and FF7 control the energization of the throttle and brake control wires CW of FIG. 2D to cause the train to operate at the desired five miles per hour; when a medium speed control is received (desired speed is fifteen miles per hour), flip-flop circuits FF15 and FF17 control the selective energization of the throttle and brake control wires CW; and, when a high speed control is received (the desired speed is forty-five miles per hour), flip-flop circuits FF45 and FF47 control the throttle and brake control wires CW.

For the purpose of explanation, it will now be assumed that the receiver coils V–RC of FIGS. 1E and 2A are receiving a low speed control calling for a train speed of five miles per hour, for example, during the spotting of train T1 at STATION A. After the car doors have been checked closed, so that low speed selecting relay LSR of FIG. 2B can be picked up, and the speed control circuits have been checked by relays SCR and OSCR of FIG. 2D, as previously described, the No. 1 power relay 1PR of FIG. 2D is picked up to connect the train traction motors for delivering the desired low speed driving power.

When the train starts in motion, the motion detector relay MDR is picked up to open its back contact 39 and disconnects the base of transistor 5Q1 from (−). However, transistor 5Q1 continues to conduct while transistor 5Q2 is maintained cut off. Furthermore, when the actual train speed reaches four miles per hour, the analog frequency output from axle driven frequency generator ADFG cause resonant reed relays RR4 to close its contact 156 for connecting the base of transistor 5Q1 to (−), via wire 119 between FIGS. 2C and 2D. Since transistor 5Q1 is already conducting, this has no effect on the flip-flop circuit FF5.

However, when the actual train speed reaches the desired five miles per hour, resonant reel relay RR5 closes its contact 118 and connects the base of transistor 5Q2 to (−) over wire 119 in FIGS. 2C and 2D. Obviously, this causes transistor 5Q2 to begin conducting which, in turn, cuts off transistor 5Q1 and thereby flips the flip-flop circuit FF5 to that condition wherein relay driver transistor 5Q3 is cut-off and speed relay 5R is dropped away. When relay 5R drops away, front contact 136 is opened and the No. 1 power relay 1PR of FIG. 2D is dropped away to open its front contact 142 which puts the train in "coast"; i.e., connects the traction motors in their idling condition as shown in FIG. 3.

If the train speed now reduced to four miles per hour, for any reason, resonant reed relay RR4 is once again energized to close its contact 156 and reconnects the base of transistor 5Q1 to (−), and, thereby flips the flip-flop circuit FF5 back to its normal condition, wherein transistor 5Q1 is conducting, transistor 5Q2 is cut-off, and speed relay 5R is picked up to again energize the No. 1 power relay 1PR, for causing a reapplication of the first throttle power setting.

If for some reason, the train speed should increase to seven miles per hour, while the traction motors of the train T1 are connected for coasting, resonant reed relay RR7 is energized and causes flip-flop circuit FF7 to flip to that condition wherein speed relay 7R is dropped away, to open its front contact 111 which is connected in series in the energizing circuit for control wire CW7. Referring to FIG. 3, this causes an application of the No. 1 brakes to be initiated and this degree of braking is maintained until the train speed properly reduced to six miles per hour, at which time flip-flop circuit FF7 is returned to its normal operating condition, wherein the speed relay 7R is picked up, to again connect the traction motors of the train for coasting. In this manner, the train T1 is properly controlled to operate around the desired five miles per hour.

Similarly, if a medium speed control is received, flip-flop circuits FF15 and FF17 cause the train T1 to maintain the desired fifteen miles per hour speed. More particularly, if a medium speed control is received, speed selecting relay MSR of FIG. 2B is picked up, as will be described, to close its front contact 157 which causes the bases of the relay driver transistors associated with flip-flop circuits FF5 and FF7 (e.g., transistor 5Q3 of FIG. 2C) to be connected to (−), in order to keep the speed relays 5R and 7R in their normal picked up positions and allow the train to attain its medium range of speed, by a circuit including front contact 158 of motion detector relay MDR, wire 159 between FIGS. 2C and 2D, front control 160 of speed check relay SCR, front contact 157 of relay MSR, wire 161 between FIGS. 2D and 2C, and isolating diodes 5D2 and 7D2 respectively. Thus, during control of the train at medium speed, the flip-flop circuits FF5 and FF7 do not cause dropaway of speed relays 5R and 7R respectively, as was previously described during low speed control, at five and seven miles per hour respectively.

During medium speed control, however, when the actual train speed reaches fifteen miles per hour, resonant reed relay RR15 is energized to drop speed relay 15R (front contact 138 opens) so that the No. 1 power relay 1PR of FIG. 2D drops away and opens its front contact 162 in the energizing circuit for the No. 2 power relay 2PR which was picked up when a medium speed control is received. When power relay 2PR drops away, the locomotive traction motor will again be connected in their coasting condition until the speed reduced to fourteen miles per hour, at which time relay 2PR is reenergized. However, if the actual train speed reaches seventeen miles per hour, so as to drop speed relay 17R, the No. 2 train brakes are applied to reduce the train speed. Thus, in substantially the same way as was previously described for controlling the train to five miles per hour when a low speed control was received, the train is now controlled to operate substantially at fifteen miles per hour.

Similarly, when a high speed control is received, flip-flop circuits FF15 and FF17 are also rendered ineffective, to control the traction motors as was previously discussed relative to flip-flops FF5 and FF7 during medium speed control, through front contact 163 of relay HSR and diodes 15D2 and 17D2 respectively, to hold speed relays 15R and 17R picked up and allow the train to attain the higher forty-five miles per hour speed. The speed relays 45R and 47R then operate to maintain the desired forty-five miles per hour train speed by controlling the energization of the control wires CW of FIG. 2D, as previously set forth. However, if the train speed should exceed forty-nine miles per hour, the frequency output of the axle driven frequency generator ADFG of FIG. 2C is permitted to pass through the high pass filter HPF49 of FIG. 2D to pick-up speed relay 49R, which when picked-up, opens its back contact 81 (see FIG. 2B) so that an application of the emergency track brakes is called for, provided this overspeed condition lasts longer than the predetermined release time for track brake control relay TBR.

*Automatic dispatching of the train*

With the lever COL in its LOAD position, and assuming that timer WT1 of FIG. 1E closes its front 155 to register that the train T1 should now be dispatched from STATION A, proceed relay PR is now energized by a circuit extending from (+), through lever COL in its load position, front contact 155 of timer WT1, and to (−). When proceed relay PR picks up to close its front contact 164, a tone modulated 1KC carrier frequency is applied to the left-hand end of track section 10T, in accordance with the traffic conditions existing in advance of track section 10T; i.e., it is supplied with the 1KC carrier frequency modulated in accordance with the tone frequencies selected by the CODE SELECTING CIRCUITS 11–10 of FIG. 1E.

Under the assumed normal conditions, the traffic conditions are clear to the left of track section 10T, and therefore, a high speed control (see FIG. 3) is now applied to the left-hand end of track section 10T so that relays VR7, VR8, VR9 of FIG. 2A are now all picked up to energize the brake control relays 2BR and 3BR of FIG. 2C, as previously described, and to register a desired train speed of forty-five miles per hour. However, before the train is permitted to proceed from the STATION A, the doors on the train are operated to and checked in their closed position, the new weight identity of train T1 is registered on weight relay VWR, and a check is made that the speed control apparatus of FIGS. 2C and 2D is in proper operating condition. All of these operations have been previously described.

Thus, when door control relay DR of FIG. 2A is dropped away, to open its front contact 34, the car doors are closed, and, when these car doors register in their closed positions, door check relay DCR will be picked up, as previously described, to permit the low speed selecting relay LSR of FIG. 2B to be picked up over the previously described circuit for initiating the speed control check. Furthermore, the dropping away of door control relay DR completes a stick circuit for weight registering relay VWR, extending over back contact 165 of relay DR and front contact 166 of relay VWR, so that the assumed lightweight identity (relay VWR picked up, as shown) of the train can be stored.

With relay LSR picked up, medium speed selecting MSR can also be picked up over front contact 167 of train control relay VR8, wire 168 between FIGS. 2A and 2B, and front contact 169 of relay LSR; while high speed selecting relay HSR of FIG. 2B can subsequently be picked up over front contact 170 of relay VR9, wire 171 between FIGS. 2A and 2B, front contact 172 of relay LSR, and front contact 173 of relay MSR.

Assuming that the speed control check indicates that the speed control apparatus of FIGS. 2C and 2D is functioning properly, the No. 1 power relay 1PR will then be picked up, as previously described, and permits the No. 2 power relay 2PR to be energized over front contact 162 of relay 1PR and front contact 174 of relay MSR; and also, the No. 3 power relay 3PR to be subsequently picked up over front contacts 175 and 176 of relays 2PR and HSR respectively.

Referring to FIG. 2D, this picking up of power relays 2PR and 3PR interrupts the energizing circuits for control wires CW5 and CW6 respectively, so that only control wires CW1 and CW7 are now being energized. As shown in FIG. 3, the train traction motors are now automatically connected in their No. 3 driving power condition necessary to accelerate the train T1 up to its nominal high speed of forty-five miles per hour. Because of the assumed clear traffic conditions, the train T1 is then operated at forty-five miles per hour over track sections 10T, 11T and 12T of FIGS. 1E and 1D, in accordance with the high speed tone modulations applied to the left-hand ends of these track sections, as previously described.

When the train passes the wayside coil 12–IL associated with identity receiver 12–IRX of FIG. 1D, the identity of the train, as stored on tuned circuits TC of FIG. 2B is now interrogated so that the track switch SW can be automatically operated to the proper position depending upon the destination of the train. Thus, as the train carried tuned circuits pass over the wayside coil 12–IL, the sweep frequency oscillator (not shown) in the identity receiver 12–IRX rapidly scans the frequency range of the tuned circuits TC and, by means of suitable decoding circuits (not shown) selectively energizes the proper wayside route identity relay BD or CD of FIG. 1D depending upon the destination registered on the train carried tuned circuits TC. Since train T1 is bound for STATION B and the subsequent stations reached over the switch SW in its "normal" position, the relay BD of FIG. 1D will be picked up as train T1 passes wayside coil 12–IL, and, this relay BD will then be stuck in its picked up position by a circuit including front contact 177 of relay 13–OCC and stick contact 178.

This picking up of route relay BD then causes energization of the normal switch control wire WN, over front contacts 179 and 180 of relays BD and 13–OCC respectively, leading to the switch control SWC and calling for the track switch SW to be operated to its assumed "normal" position (as shown) for routing train T1 towards STATION B. However, since the track switch SW is already in the "normal" position, no further operation of the track switch is necessary. The front contact 180 of relay 13–OCC is included in the energizing circuit to the switch control wires WN and WR so that the track switch SW will be locked in its operated position as long as a train occupies the detector track section 13T surrounding the track switch SW, thus preventing switch movement under the train.

A conventional switch correspondence relay NWC of FIG. 1D detects that the track switch is in its "normal" position, before the left-hand end of detector track section 13T is supplied with train control information, by transmitter 13ATX, as selected by CODE SELECTING CIRCUITS 14–13 in accordance with advance traffic conditions existing along the route to be taken by train T1 towards STATION B, i.e., front contacts 181 of relay NWC must be closed before the detector track section is supplied with the tone modulated 1KC carrier frequency.

Similarly, if the train T1 had been destined for STATION C (not shown), the track switch SW would have been automatically operated to its "reverse" position, as the train passed wayside coil 12–IL and caused pick up of route relay CD, due to the energization of reverse control wire WR of FIG. 1D over front contact 182 of relay CD, and furthermore, the detector track section 13T would have been supplied with train control information, by transmitter 13B–TX, as selected by CODE SELECTING CIRCUITS 14B–13, provided, of course, that front contacts 183 of reverse switch correspondence relay RWC are closed to indicate that the switch SW has been properly positioned for this train move towards STATION C (not shown).

Assuming now that track switch SW is in its "normal" position; that normal switch correspondence relay NWC is picked up; and, that detector track section 13T is being supplied with a high speed control, the train T1 then continues at its nominal high speed of forty-five miles per hour over track sections 13T and 14T until it arrives at track section 15T of FIG. 1C which, in the selected embodiment, is assumed to include a curved track portion CU shown dotted in FIG. 1C.

*Control at curve*

As mentioned previously, it is desirable to restrict the speed of certain identity class trains; e.g. heavyweight trains, below the higher speed called for by clear traffic conditions, when such higher speeds may be excessive, while allowing the remaining trains to be controlled solely in accordance with advance traffic. Assuming that the train T1 is of lightweight classification, even when loaded with passengers; i.e., less than half of the car switches CS of FIG. 2A are opened and therefore weight relay VWR of FIG. 2A is picked up, when the train T1 passes wayside coil 14-IL, wayside weight relay 14-WWR will remain dropped away (as illustrated) so that the train T1 is controlled in accordance with advance traffic conditions; i.e., it may continue at its nominal high speed of forty-five miles per hour.

However, if the train T1 had been of heavyweight classification; i.e., relay VRW of FIG. 2A dropped away, the wayside weight relay 14-WWR would have been picked up by the identity receiver 14-IRX to change the train control tone modulations applied to the left-hand end of track section 15T from the high speed control called for by advance traffic conditions to a low speed control proper for controlling heavyweight trains around the curved portion CU of track section 15T.

More specifically, code selecting relay 15-3CR is normally picked up, to register the clear advance traffic conditions, over front contracts 184, 185 and 186 of relays 16-OCC, 16-R2 and 16-R3 respectively, back contacts 187, 188, 189 and 190 of relays 15-6CR, 15-2CR, and 14-WWR respectively, along wire 191 leading to the control office, and through front contact 192 of block relay 15-BL. However, when the wayside weight relay 14-WWR picks up, as previously described, code selecting relay 15-1CR is then picked up (relay 15-3CR dropped away), to apply a low speed control to the left-hand end of track section 15T, by a circuit including front contact 184 of relay 16-OCC, back contact 193 of relay 15-6CR, front contact 194 of wayside weight relay 14-WWR, along wire 191 leading to the control office, and through front contact 192 of block relay 15-BL. As soon as the relay 15-1CR is picked up, it is then stuck over its own front contact 195 and front contact 196 of relay ECR of FIG. 1C. The 1 kc. carrier frequency now applied to track section 15T is modulated by coded tone TN1, applied to the modulator 15-MOD over front contact 197 of code transmitter 15-CT, and by uncoded tone TN2, applied to the modulator 15-MOD over front contact 198 of code selecting relay 15-1CR. The reception of this low speed control on the train T1 then causes it to be controlled to five miles per hour, as will be described, until the head end of the train T1 passes the wayside loop ECL which is situated to the left of the track curve CU.

This wayside loop ECL normally has a voltage induced in it due to the modulated carrier frequency applied to the left-hand end of track section 15T, by transmitter 15-TX. More specifically, this modulated carrier current flows down one rail of section 15T, through the ballast leakage, and back to the left-hand end of section 19T over the other rail, and thereby normally induces a voltage in loop ECL, which voltage is then amplified by receiver ECRX and causes relay ECR to be normally picked up.

Thus, when the train passes loop ECL and shunts the track rails between loop ECL and transmitter 15-TX, relay ECR is dropped away to detect that the train has traversed the curve CU so that front contact 196 of relay ECR is then opened to drop code selecting relay 15-1CR, for changing the train control information applied to the left-hand end of track section 15T back to the high speed control called for in accordance with traffic conditions to the left of the track section 15T.

In the illustrated embodiment of this invention, the wayside loop ECL is preferably situated in advance of the curve CU (to the left in drawings, as shown) by a distance sufficient to permit the longest train being controlled to completely clear the curve CU, before the relay ECR is dropped away, as previously described, to revert back to control solely in accordance with traffic conditions.

It should be noted in FIG. 1C that if traffic conditions in advance of section 15T are such that a more restrictive train speed is called for by traffic than is called for by the train identity; e.g., code selecting relay 15-6CR is picked up to register that track section 16T is occupied, the energizing circuit for code selecting relay 15-1CR would be interrupted at back contact 193 of relay 15-6CR so that the train will always be controlled to the more restrictive of the respective train speeds called for by traffic conditions and the train identity.

When the low speed control is received on the train T1 (assuming train T1 is heavyweight); i.e., low speed selecting relay LSR of FIG. 2B remains energized while the medium and high speed relays MSR and HSR respectively are both dropped away, the bases of relay driver transistors Q3, associated with flip-flop circuits FF5 through FF17, are disconnected from (—) by the opening of front contracts 157 and 163 of relay MSR and HSR respectively. Therefore, speed relays 5R, 7R, 15R and 17R are now all dropped away, since the flip-flop circuits FF5 through FF17 have each been previously flipped to that condition wherein their respective right-hand transistors (e.g. transistor 5Q2) are conducting during acceleration of the train T1 to its present speed of forty-five miles per hour, as previously described. Referring to FIGS. 2C and 2D, under present conditions, the power relays 1PR, 2PR and 3PR of FIG. 2D are all dropped away so that no driving power is now being developed by the traction motors.

With speed relay 7R and the medium speed selecting relay MSR both dropped away, the base of the relay driver transistor 17Q3, associated with flip-flop circuit FF17, is now connected to (+) in FIG. 2C by a circuit including front contact 199 of motion detector relay MDR, wire 200 between FIGS. 2C and 2D, front contact 201 of speed check relay SCR, wire 202 between FIGS. 2D and 2C, back contact 203 of speed relay 7R, wire 204 between FIGS. 2C and 2D, back contact 205 of relay MSR, and diode 17D3. Similarly, the base of the relay driver transistor (not shown) associated with flip-flop circuit FF47 is also connected to (+) over back contacts 206, 207 and 208 of relays 15R, 17R and HSR respectively, and through the corresponding diode 45D3, so that speed relay 47R is now also dropped away, and referring to FIG. 2D, control wires CW1, CW5, CW6 and CW7 are now all deenergized to initiate application of the No. 3 train brakes in accordance with the chart shown in FIG. 4.

This application of the No. 3 train brakes is enforced until speed relay 15R picks up at fourteen miles per hour, at which time resonant reed relay RR14 closes its associated contact 209 and thereby causes flip-flop circuit FF15 to be flipped to its normal condition wherein speed relay 15R is picked up, as previously described. With speed relay 15R picked up, to open its back contact 206, the base of the relay driver transistor controlling speed relay 47R is disconnected from (+), and, speed relay 47R is once again picked up to close its front contacts 102, 108 and 114 of FIG. 2D. However, speed relay 17R cannot be picked up at this time because of the connection of the base of relay driver transistor 17Q3 to (+) in FIG. 2C over the previously described circuit including back contact 203 of speed relay 7R. Thus, the control wires CW5 and CW7 are kept deenergized, at open front contacts 106 and 113 of speed relay 17R, whereas control wire CW6 can be energized, at fourteen miles per hour, and thus reduces the amount of braking on the train from the No. 3 to the No. 2 train brakes.

When the train speed reduces to six miles per hour, flip-flop circuit FF7 is flipped back to that normal condition wherein speed relay 7R is picked up to open its back contact 203. As previously mentioned, the opening of back contact 203 of relay 7R disconnects the base of relay driver transistor 17Q3 (see FIG. 2D) from (+), so that speed relay 17R can now be picked up to permit energization of control wires CW5 and CW7. Referring to FIG. 4, with control wires CW5, CW6 and CW7 now energized, the traction motors of the train are connected for coasting.

The train is then kept in coasting condition until speed relay 5R picks up (at four miles per hour) at which time the No. 1 power relay 1PR of FIG. 2D is then picked up to cause energization of forward control wire CW1, which automatically connects the train traction motors for suppling the first or minimum degree of driving power. In substantially the same manner, as was previously described, the train is then controlled to operate around the desired speed of five miles per hour while it is travelling over the curved portion CU of track section 15T (see FIG. 1C).

As soon as the train T1 is detected as having cleared the curve CU, as previously described, a high speed control, as called for by advance traffic conditions, is once again applied to the left-hand end of track section 15T to permit the train T1 to increase its speed up to forty-five miles per hour. As previously mentioned, this higher speed is attained by keeping the speed relays 5R, 7R, 15R and 17R picked up (via diodes 5D2, 7D2, 15D2 and 17D2) even though the associated flip-flop circuits FF5 through FF17 are actuated during acceleration of the vehicle, i.e., these flip-flop circuits are flipped to that condition wherein the right-hand transistor (e.g. transistor 5Q2) are conducting. The train T1 is then controlled to operate at forty-five miles per hour over track sections 16T, 17T and 18T of FIGS. 1C, 1B and 1A.

It should be pointed out at this time that during operation of the train T1, at the desired speed called for by that high frequency track circuit, an additional stick circuit is provided for the zero speed check relay OSCR of FIG. 2D which includes front contact 210 of motion detector relay MDR and wire 211 extending between FIGS. 2C and 2D. This stick circuit is provided to insure that the relays OSCR and SCR will be retained in their picked up positions, indicating that a speed check was properly made, in the event that the low speed selecting relay LSR momentarily drops away to open its front contact 130, for example, because of a momentary loss of control information, and thus avoids the necessity of having to completely stop the train and recheck the speed control apparatus.

*Stopping at station platform*

As previously mentioned, while the train T1 is on the approach to track section 19T of FIG. 1A, its identity is again interrogated and utilized to select the proper stopping pattern at STATION B. Thus, as the train carried tuned circuits TC of FIG. 2B pass the wayside coil 18–IL of FIG. 1A, the associated identity receiver 18–IRX acts to selectively energize the wayside weight and length identity registering relays 19–WWR and 19–WLR respectively, in accordance with the particular weight and length identity previously registered on the train T1; i.e., relay 19–WWR is picked up in response to the passage of a lightweight train and remains dropped away for heavy trains, while relay 19–WLR is picked up for short trains and remains dropped away for long trains. Since the train T1 has been assumed here to be a relatively short, lightweight train, the relays 19–WWR and 19–WLR will both be picked up by energy from the receiver 18–IRX and over the obvious circuits of FIG. 1A which include a common front contact 212 of relay RD of FIG. 1A.

Referring now to FIG. 1A, with track section 19T unoccupied, the wayside loops LA, LB, LC and LD each has a voltage induced in it due to the modulated carrier frequency being applied to the left-hand end of track section 19T, by transmitter 19–TX. More specifically, the modulated carrier current, applied by transmitter 19–TX, flows down one rail, through the ballast leakage, and back to the left-hand end of section 19T over the other rail, and thereby, normally induces a voltage in loops LA, LB, LC and LD. These induced voltages are then amplified by receivers RXA, RXB, RXC and RXD which are tuned to the carrier frequency, and cause the associated wayside relays RA, RB, RC and RD of FIG. 1A to be normally picked up.

As train T1 enters track section 19T, the voltage induced in the loop LA increases to a maximum just before the train arrives at the loop LA and this voltage diminishes to zero when the train passes and shunts the track rails between the loop LA and the transmitter 19–TX; i.e., the left-hand end of track section 19T. With zero induced voltage on wayside loop LA, relay RA drops away to close its back contact 213, but, because the train T1 is a lightweight train, this dropping of relay RA is of no consequence; i.e., the dropping of relay RA being utilized in the proper control of heavyweight trains.

However, when train T1 passes wayside loop LB, so as to drop the associated relay RB, the train control information applied to the left-hand end of track section 19T is changed from the high speed control called for by advance traffic to a low speed control; i.e., code selecting relay 19–1CR is now energized by a circuit extending from (+), through back contact 214 of relay RB, front contact 215 of wayside weight registering relay 19–WWR, back contact 216 of timer WT2, back contact 217 of relay 19–5CR, back contact 218 of relay 19–6CR, front contact 219 of occupancy relay 20–OCC, and to (−).

Referring now to FIGS. 2A through 2D, the reception of this low speed control on the train by receiver coils V–RC causes the medium and high speeds selecting relays MSR and HSR of FIG. 2B to be dropped away so that the train T1 is automatically slowed down to five miles per hour, as previously described.

Since the train T1 is assumed here to be of relatively short length, when it passes wayside loop LC, so as to drop the associated relay RC, code selecting relay 19–5CR is then energized over back contact 220 of relay RC, front contact 221 of wayside length registering relay 19–WLR, and back contacts 222 and 223 of timer WT2 and code selecting relay 19–6CR respectively. This picking up of code selecting relay 19–5CR causes a station stop brake control message to be applied to the left-hand end of track section 19T calling for application of the No. 3 train brakes; i.e., the 1 kc. carrier frequency from oscillator 19–OSC is modulated by tone TN1 (coded) and uncoded tone TN4 (see FIG. 3).

Referring to FIG. 2A, the reception on the train of the station stop brake control causes train control relay VR9 only to be picked up which retains the brake control 2BR of FIG. 2C picked up, while brake control relay 3BR is now dropped away to open its front contacts 99, 103 and 109 in the energizing circuits for control wires CW6, CW5 and CW7 respectively, of FIG. 2D. At the same time, low speed selecting relay LSR, is dropped away, by the opening of front contact 93 of train control relay VR7, and causes the No. 1 power relay 1PR of FIG. 2D to also drop away. Thus, the No. 3 train brakes are applied and the train T1 is then brought to a standstill at the platform of STATION B.

As soon as the motion detector relay MDR of FIG. 2C drops away, to indicate that the train T1 has properly stopped at STATION B, the door control relay DR of FIG. 2A is once again picked up as previously described, to open the doors of the train so that the passengers waiting at STATION B may board the train for transportation to subsequent stations (not shown) to the left of STATION B.

It should be noted in FIG. 1A that if the train T1 had been a relatively long train; i.e., wayside length registering relay 19-WLR would remain dropped away when the train passed wayside coil 18-IL, station stop brake control would not have been applied to the left-hand end of track section 19T until the train passed wayside loop LD which is positioned to the left of wayside loop LC, and therefore, provides that the longer trains be stopped further along track section 19T than the relatively short trains, with the result that all trains are substantially centered at the platform of STATION B, for example, so as to provide more convenience to the passengers.

Similarly, if train T1 has been a heavyweight train, wayside weight registering relay 19-WWR which would have been retained dropped away as the train passed wayside coil 18-IL, and therefore, a low speed control code would have been applied to the left-hand end of track section 19T to initiate slowing down of the train T1, when the train passes the wayside loop LA, instead of waiting until wayside loop LB as was previously pointed out for the relatively short train. This takes into account that heavy trains need to begin slowing down farther from the stopping point than light trains.

The length of time for which the train T1 remains at STATION B is determined by the wayside timer WT2 of FIG. 1A which is assumed here to also be preset in accordance with the time schedule for the various trains utilizing the illustrated track layout. Thus, when the train T1 passes wayside loop LC, so as to drop the associated relay RC, timer WT2 is energized to initiate its timing operation over back contact 220 of relay RC and front contact 221 of wayside length registering relay 19-WLR (train T1 assumed to be lightweight). As soon as timer WT2 completes its timing operation, and opens its back contact 216, the station stop brake control transmission then being applied to the left-hand end of track section 19T is terminated (code relay 19-5CR is dropped away) and the left-hand end of track section 19T is then energized with the 1 kc. carrier frequency modulated in accordance with the traffic conditions existing to the left of track section 19T; i.e., dependent upon the positions of relays 20-OCC, 20-R2, 20-R3 and 20-R4 of FIG. 1A, so that train T1 can then continue to the left of STATION B towards the subsequent stations (not shown).

As was previously mentioned, before any such proceed control is effective to start the train T1 in motion, however, the doors of the vehicle are checked in their closed position, a new weight identity registration is established on tuned circuit TCW of FIG. 2B, and a check is performed of the speed control apparatus of FIGS. 2C and 2D.

*Control of following trains*

Referring to the wayside apparatus of FIGS. 1A through 1E, and as previously pointed out, the particular tone modulations applied to the left-hand end of each of the track sections is dependent upon the advance traffic conditions existing to the left of that track section, so that the location of each train properly controls the operation of following trains and thereby maintains safe operating distances between the various trains.

Referring to FIG. 1B, for example, if track section 19T is occupied, occupancy relay 19-OCC will be dropped away and causes pick-up of code selecting relay 18-6CR, over back contact 224 of relay 19-OCC, so that a No. 3 brake control (the 1 kc. carrier frequency is modulated with coded tone TN1 and uncoded tones TN3 and TN4) will be properly applied to the left-hand end of track section 18T for stopping a following train as soon as such following train enters track section 18T. It should be remembered that this brake control transmission, utilized for stopping the trains between stations, is different from the station stop brake control transmission previously described, in that the door hold relay DHR is energized by reception of this particular brake control message and prevents the doors from being opened, as previously described.

Similarly, if track section 20T (partially shown in FIG. 1A) is occupied, while track section 19T is unoccupied, code selecting relay 18-2CR will be picked up, to cause a medium speed control transmission to be applied to the left-hand end of track section 18T by a circuit including front contact 23 of occupancy relay 19-OCC, back contact 225 of relay 19-R2, front contacts 226 and 227 of relays 19-R3 and 19-R4 respectively, back contact 228 of code selecting relay 18-6CR, along wire 28 leading to the control office, and over front contact 29 of block relay 18-BL. As previously mentioned, if track sections 19T and 20T are both unoccupied, a high speed control is applied to the left hand end of track section 18T; i.e., code selecting relay 18-3CR is picked up as illustrated.

It should be pointed out at this time that the control office is capable of causing a No. 3 brake control message to be applied in any desired track section, for remotely stopping any train. More specifically, and with reference to FIG. 1B, for example, if the control office operator depresses stop push button 18-STPB and thereby drops the associated block relay 18-BL, code selecting relay 18-6CR will be immediately picked up over back contact 229 of block relay 18-BL and wire 230 so that a No. 3 brake control will be communicated throughout track section 18T of FIGS. 1A and 1B. As mentioned previously, it has been assumed here that the control office is kept informed as to the location of all trains in the track layout by conventional CTC indication circuits (not shown).

*Modification shown in FIG. 7*

Referring to FIG. 7 of the accompanying drawings, modified circuit apparatus, according to the present invention, is illustrated which provides an additional check to authenticate a wayside to train transmission before such transmission can be effective on the vehicle for purposes of train control and/or remotely register a train identity.

More specifically, the wayside apparatus in this modified form of FIG. 7 provides that two tones of a possible four are always transmitted for each operation to be performed on the train T7; i.e., whether train control or remote identity registration. Thus, when a particular code selecting relay (for example, relay 7-3CR) is picked up in accordance with the desired operation to be performed on the vehicle, two of the tones TN1, TN2, TN3, or TN4 are applied to the wayside modulator 7-MOD for selectively modulating the one kilocycle carrier frequency from the wayside oscillator 7-OSC. This modulated carrier frequency is then applied to the left-hand end of the illustrated track section 7T (assuming that traffic is directed from right to left in FIG. 7), and, depending upon whether or not the relay 7-CIR is picked up to close its front contact 231 or released to close back contact 232, the modulating tones are coded at a preselected rate or uncoded respectively, to indicate that the transmission is for train control purposes or remote identity registration respectively. For example, the relay 7-CIR might be controlled in the same manner as the corresponding relay CIR of FIG. 1E.

This track circuit information is then inductively received by receiver coils V-RC'; is fed through a bandpass filter 47'; and, is fed to a carrier amplifier 48' which increases the strength of the received signal to the proper operating value. The amplified information is then demodulated at diodes TD1' and TD2' and is utilized to selectively energize a plurality of resonant reed relays RRX1 through RRX4 dependent upon the particular tone modulations received, provided also that the carrier of relay VR' is picked up to close its front contacts 233 which indicates that the carrier frequency has been properly received.

The resonant reed relays RRX1 through RRX4 then control the energization of a plurality of tone relays VXR1 through VXR4. Depending upon whether or not the received tone modulations are coded at a preselected rate or uncoded (whether or not decoding relay VR3' is picked up or released), the information registered on tone relays VXR1 through VXR4 is then utilized to either control the energization of the train control relays VR7', VR8', and VR9', over front contacts 234 or relay VR3', to select the desired train speed, or else, are utilized to control the identity registering relays VR10', VR11' and VR12', over back contacts 235 of relay VR3', in accordance with the identity to be remotely registered on the train.

The contacts of tone relays VXR1 through VXR4 are so arranged in FIG. 7 as to require that two and only two of these relays be picked up before the train control relays or the identity registering relays can be operated. Obviously, by requiring that two and only two tones are received from the wayside, an additional check is provided for authenticating the wayside to vehicle transmission, so that extraneous signals will not cause faulty operation. Furthermore, by coding the wayside to vehicle transmission (at code transmitter 7–CT), when such transmission is for train control purposes; i.e., controlling cab signalling or operating the vehicle throttle and brakes, faulty train control by extraneous signals is also obviated.

As previously mentioned, the train speed control information communicated over the high frequency track circuit, in accordance with the present invention, could also be used to operate suitable cab signalling on the vehicle, if desired. Thus, in FIG. 7, a cab signal is illustrated which is controlled by train control relays VR7', VR8', and VR9' which, in turn, are energized in accordance with the received train speed control information from the track circuit. For example, when relays VR7', VR8', and VR9' are all deenergized, as shown, the stop signal lamp R is illuminated over back contacts 236, 237 and 238 of relays VR7', VR8' and VR9' respectively, whereas, the proceed signal lamps G, G/Y and Y are selectively illuminated when the train control relays are calling for high, medium and low speed operation respectively.

Having thus described a vehicle control system, as one specific embodiment of the present invention, it is desired to be understood that this form is selected to facilitate in the disclosure of the invention rather than to limit the number of forms which it may assume; and, it is to be further understood that various other modifications, adaptations and alterations may be applied to the specific form shown to meet the requirements of practice, without in any manner departing from the spirit or scope of the present invention. For example, although in the above discussion it has been assumed that amplitude modulating of the one kilocycle carrier frequency is employed, it should be understood at this time that frequency modulation could also be utilized, if desired, for the purpose of minimizing outside interferences.

What I claim is:

1. In a system for remotely controlling the operation of vehicles from the wayside along a right of way having a substantial portion thereon over which vehicles of different identities are to be operated differently during similar advance traffic conditions, the combination of,
 (a) information conveying means on the wayside for substantially continuously conveying selected control messages from the wayside portion to said vehicles while they are passing over said portion of the right of way distinctive to the desired operation of said vehicles on said right of way, and
 (b) message selecting means responsive to the identity of a vehicle approaching said right of way portion for selecting the control message to be conveyed from the wayside to said vehicle by said information conveying means in accordance with the identity of said approaching vehicle, said message selecting means comprising vehicle identity communicating means partly on the vehicle and partly on the wayside in the approach of said right of way portion for communicating information distinctive of the identity of said approaching vehicle from said vehicle to the wayside.

2. The control system specified in claim 1 wherein the control message conveyed to a particular vehicle is distinctive of the desired speed for said vehicle on said right of way portion, and wherein said vehicle is equipped with speed control means responsive to the actual speed of said vehicle and to said conveyed control message effective to cause said vehicle to operate at said desired speed on said right of way portion.

3. In a system for controlling the operation of vehicles over a stretch of right of way having a substantial portion thereon over which vehicles of a predetermined identity class are desired to be operated at speeds up to a predetermined first speed limit, the combination of,
 (a) information conveying means on the wayside for substantially continuously communicating selected speed control messages from the wayside portion to said vehicles while they are passing over said portion of the right of way distinctive of the proper vehicle speed limit on said right of way,
 (b) traffic controlled means responsive to traffic conditions existing on said stretch of right of way in advance of a vehicle approaching said right of way portion for determining a second speed limit up to which said vehicle may safely operate in accordance with advance traffic conditions,
 (c) vehicle identifying means effective when a vehicle is approaching said right of way portion for detecting the identity class of said approaching vehicle, and,
 (d) control message selecting means responsive to said vehicle identifying means and said traffic controlled means for selecting the speed control message to be conveyed to said approaching vehicle, whereby said vehicle is controlled to operate over said right of way portion at speeds up to the more restrictive of said first and second speed limits when said vehicle is of said predetermined identity class.

4. In a system for controlling the operation of a railway train over a stretch of track having a portion thereof over which trains of a predetermined identity class are desired to travel at speeds below a predetermined first speed limit, the combination of,
 (a) means for applying speed control information to the rails of said stretch of track in advance of said train distinctive of the proper operating speed for said train on said stretch of track,
 (b) traffic controlled means responsive to traffic conditions existing on said stretch of track in advance of said train for determining a second speed limit up to which said train may safely operate in accordance with said advance traffic conditions,
 (c) means at the approach to said track portion for interrogating the identity of said train as it approaches said portion,
 (d) selecting means responsive to said interrogating means and to said traffic controlled means for selecting the speed control information to be applied to the track rails by said applying means in accordance with the more restrictive of said first and second speed limits when said train is of said predetermined identity class, and (e) means carried on said train including receiver means for receiving the speed control information being applied to the track rails effective to control the speed of said train in accordance with said received speed control information.

5. The combination specified in claim 4 including wayside means effective to register when said train leaves said track portion for causing the rails of said stretch of track in advance of said train to be thereafter applied with speed control information selected solely in accordance with traffic conditions existing in advance of said train.

6. The combination specified in claim 4 wherein the means for applying speed control information to the rails of said stretch of track comprises,
(a) means for generating a carrier frequency,
(b) means for generating a plurality of tone frequencies,
(c) means for modulating said carrier frequencies with selected ones of said plurality of tone frequecies in accordance with the proper operating speed of said train on said stretch of track, and
(d) transmitting means for applying said modulated carrier frequency to the rails of said stretch of track in advance of said train, and wherein said train carried means comprises,
(e) means for demodulating said received modulated carrier frequency, and
(f) speed control means responsive to said demodulating means for controlling the speed of said train in accordance with the particular tones contained in said received control information.

7. In a wayside to vehicle communication system for remotely controlling a vehicle along a right of way, said vehicle having a plurality of functions thereon to be controlled, the combination of,
(a) means for providing a registration of a distinctive identity of said vehicle and means for providing a registration of the desired running speed of said vehicle,
(b) means for generating a carrier frequency,
(c) means for generating a plurality of tone frequencies,
(d) coding means for coding one of said tone frequencies at a preselected rate distinctive of the vehicle carried function selected to be controlled by the remaining tone frequencies,
(e) modulating means for modulating said carrier frequencies with said one tone frequency and different ones of the remaining tone frequencies dependent upon the desired control to be exercised over said selected function,
(f) transmitting means for transmitting said modulated carrier frequency to said vehicle, and
(g) control means on said vehicle including receiving means for receiving said modulated carrier frequency effective to exercise the desired control of said selected vehicle carried function in accordance with the tone modulations of said received modulated carrier frequency, whereby said transmitted modulated carrier frequency is effective to remotely control selectively said identity registering means and said speed registering means dependent upon whether or not said one tone frequency is coded at said preselected rate.

8. The communication system specified in claim 7 adapted for controlling a railway vehicle on a stretch of track, wherein,
(a) said transmitting means are connected electrically to the rails of said track stretch in advance of said railway vehicle for applying said modulated carrier frequency to the rails of said track stretch, and wherein,
(b) said receiver means are mounted on said railway vehicle for inductively picking up the transmitted modulated carrier frequency from said track rails.

9. A speed control system for a vehicle having a variable driving power unit operable to a plurality of power settings and a braking mechanism thereon and desired to travel at a speed between upper and lower predetermined speed limits comprising,
(a) means for generating a frequency analog of the actual speed of said vehicle,
(b) a first flip-flop circuit operably connected to select the setting of said driving power unit and having a first operating condition wherein a predetermined driving power setting is selected to accelerate said vehicle toward said desired speed and a second operating condition wherein a reduced power setting is selected to just maintain said desired speed,
(c) a first circuit means responsive to the output frequency of said analog frequency generating means and said desired speed effective to actuate said first flip-flop circuit to its second operating condition when the actual speed of said vehicle has been increased to said lower speed limit,
(d) a second circuit means responsive to the output frequency of said analog frequency generating means and said desired speed effective to actuate said first flip-flop circuit back to its first operating condition if the actual vehicle speed reduces below said lower speed limit,
(e) a second flip-flop circuit operably connected to said braking mechanism and having a first operating condition wherein said braking mechanism is unactuated and a second operating condition wherein said braking mechanism is actuated to cause vehicle braking,
(f) a third circuit means responsive to the output frequency of said analog frequency generating means and said desired speed effective to actuate said second flip-flop circuit to its second operating condition if the actual vehicle speed increases above said upper speed limit,
(g) a fourth circuit means responsive to the output frequency of said analog frequency generating means and said desired speed effective to actuate said second flip-flop circuit back to its first operating condition if the actual vehicle speed reduces below said upper speed limit,
(h) oscillator circuit means operably connected to supply predetermined first and second output frequencies to said first and second flip-flop circuits respectively, said first output frequency being of a value equal to the frequency generated by said analog frequency generating means when the actual vehicle speed increases to said lower speed limit and said second output frequency being of a value equal to the frequency generated by said analog frequency generating means when the actual vehicle speed has been increased to said upper speed limit,
(i) a checking relay operably connected to said first and second flip-flop circuits so as to be energized only provided that said first and second flip-flop circuits are each operated to their second operating condition by said first and second output frequencies from said oscillator circuit means, and
(j) a contact of said checking relay operably connected to prevent acceleration of said vehicle when said checking relay is deenergized.

10. A control system for remotely controlling the stopping of vehicles of various identities at a desired stopping point located along a stretch of right of way being travelled by each vehicle and at which a different stopping pattern is necessary for vehicles of different identities, the combination of,
(a) vehicle identifying means on the wayside in advance of said stopping location point operable to a condition distinctive of the identity of each vehicle approaching said stopping point, (b) means responsive to said vehicle identifying means effective to select a proper stopping pattern for each vehicle in accordance with the condition of said vehicle identifying means, (c) information conveying means on the wayside responsive to said selecting means for conveying a control message from the wayside to a vehicle distinctive of the selected proper stopping pattern for said vehicle, and (d) control means on said vehicle responsive to said conveyed message for controlling said vehicle to come to a stop at said stopping point according to said selected proper stopping pattern.

11. The control system according to claim 10 wherein said vehicle is equipped with braking means and wherein said vehicle carried control means is rendered effective in response to said conveyed control message to operate said braking means as necessary to cause said vehicle to follow said selected proper stopping pattern.

12. The control system according to claim 10 wherein the identity of said vehicle is dependent upon the weight of said vehicle and wherein said stopping pattern selecting means includes weight responsive means effective to control the selection of the proper stopping pattern for said vehicle in accordance with the weight of said vehicle.

13. The control system according to claim 10 wherein the identity of said vehicle is dependent upon the length of said vehicle and wherein said stopping pattern selecting means includes length responsive means effective to control the selection of the proper stopping pattern for said vehicle in accordance with the length of said vehicle.

14. In a system for controlling the stopping of vehicles at a predetermined stopping point, the combination of, (a) first registering means for registering the actual location of a vehicle relative to said stopping point, (b) second registering means for registering the length of said vehicle, and (c) braking control means responsive to said first and second registering means for controlling the application of braking action to said vehicle, whereby vehicles of different lengths are stopped substantially centered at said stopping point.

15. A system for registering the weight class of a train of cars comprising, (a) individual car weighing means responsive to the loading of each individual car of said train, and (b) train weight registering means responsive to the individual car weighing means for every car in said train effective to provide a registration of the weight class for the entire train of cars.

16. The system specified in claim 15 wherein said train weight registering means includes a relay having an energizing circuit and means for supplying said circuit with a current magnitude dependent upon the loading of each car in said train of cars.

17. The system specified in claim 16 wherein said relay energizing circuit includes a variable resistance and means for adjusting said variable resistance in accordance with the number of cars in said train.

References Cited by the Examiner

UNITED STATES PATENTS

| | | | |
|---|---|---|---|
| 853,388 | 5/1907 | Watts | 177—136 |
| 1,407,078 | 2/1922 | Murray | 177—137 |
| 2,451,319 | 10/1948 | Candy et al. | 340—146.1 |
| 2,470,145 | 5/1949 | Clos | 340—146.1 |
| 2,673,292 | 3/1954 | Treharne | 246—2 X |
| 2,915,623 | 12/1959 | Hughson | 246—63 X |
| 2,981,830 | 4/1961 | Davis et al. | 246—2 |
| 3,041,448 | 6/1962 | Pascoe et al. | 246—8 X |
| 3,045,112 | 7/1962 | Hailes | 246—8 X |
| 3,046,394 | 7/1962 | Mishelvich et al. | 246—182.1 |
| 3,072,785 | 1/1963 | Hailes | 246—187 X |
| 3,096,056 | 7/1963 | Allison | 246—182 X |
| 3,109,505 | 11/1963 | Davis et al. | 177—137 |
| 3,128,070 | 4/1964 | Harris et al. | 246—122 |
| 3,188,463 | 6/1965 | Hines | 246—182 |
| 3,229,086 | 1/1966 | Allison | 246—187 |

ARTHUR L. LA POINT, *Primary Examiner.*

LEO QUACKENBUSH, *Examiner.*

S. B. GREEN, *Assistant Examiner.*